Feb. 21, 1939.  H. P. BOSWAU  2,148,044
SUPERVISORY CONTROL SYSTEM
Filed May 27, 1932  6 Sheets-Sheet 2

INVENTOR
HANS P. BOSWAU
ATTORNEY

Patented Feb. 21, 1939

2,148,044

UNITED STATES PATENT OFFICE 2,148,044

SUPERVISORY CONTROL SYSTEM

Hans P. Boswau, Galion, Ohio, assignor to The North Electric Mfg. Company, Galion, Ohio, a corporation of Ohio Application May 27, 1932, Serial No. 613,865

10 Claims. (Cl. 177—353)

My invention relates to signalling systems and more particularly to supervisory control systems in which a plurality of remotely disposed apparatus units, such as circuit breakers, are selectively controlled and supervised from a central dispatching point.

In supervisory control systems it is highly desirable that the selection and operation be performed with the highest possible speed and that the accuracy of the remote selection be ensured beyond a doubt.

I have discovered that I can readily select one out of at least five breakers over a single signalling circuit with a single selecting impulse, which accordingly requires a minimum amount of time. Similarly, one out of at least twenty-five breakers can be selected with two impulses, thus providing a very high speed of selection. A very important advantage of the high selection speed is that inductive disturbances produced in the signalling circuit by adjacent power lines are much less likely to occur during the extremely small period of time required for selection in my system than during the comparatively long period of time required in systems employing long series of impulses for selecting purposes.

Accordingly, an object of my invention is to provide a novel method of signalling.

Another object of my invention is to provide novel apparatus for and methods of selecting a plurality of units with a single code pulse over a single signalling circuit.

A further object of my invention is to provide novel apparatus for and methods of signalling which will insure correct selection of the remote units.

A still further object of my invention is to provide novel means whereby a remote code selection is also simultaneously set up locally at the sending station and compared with a check code received back from the remote station to determine whether a correct remote selection has been made.

Another object of my invention is to provide metering, synchronizing and voltage regulation in the system described above, all over a single signalling circuit.

Still another object of my invention is to provide, in a supervisory control system, for connecting a meter to a single signalling circuit at one station and a metering transmitter and raise-lower control apparatus to the circuit at another station, and selectively operating the raise-lower control apparatus, the functioning of which is transmitted to the meter by the metering transmitter.

Figure 1:
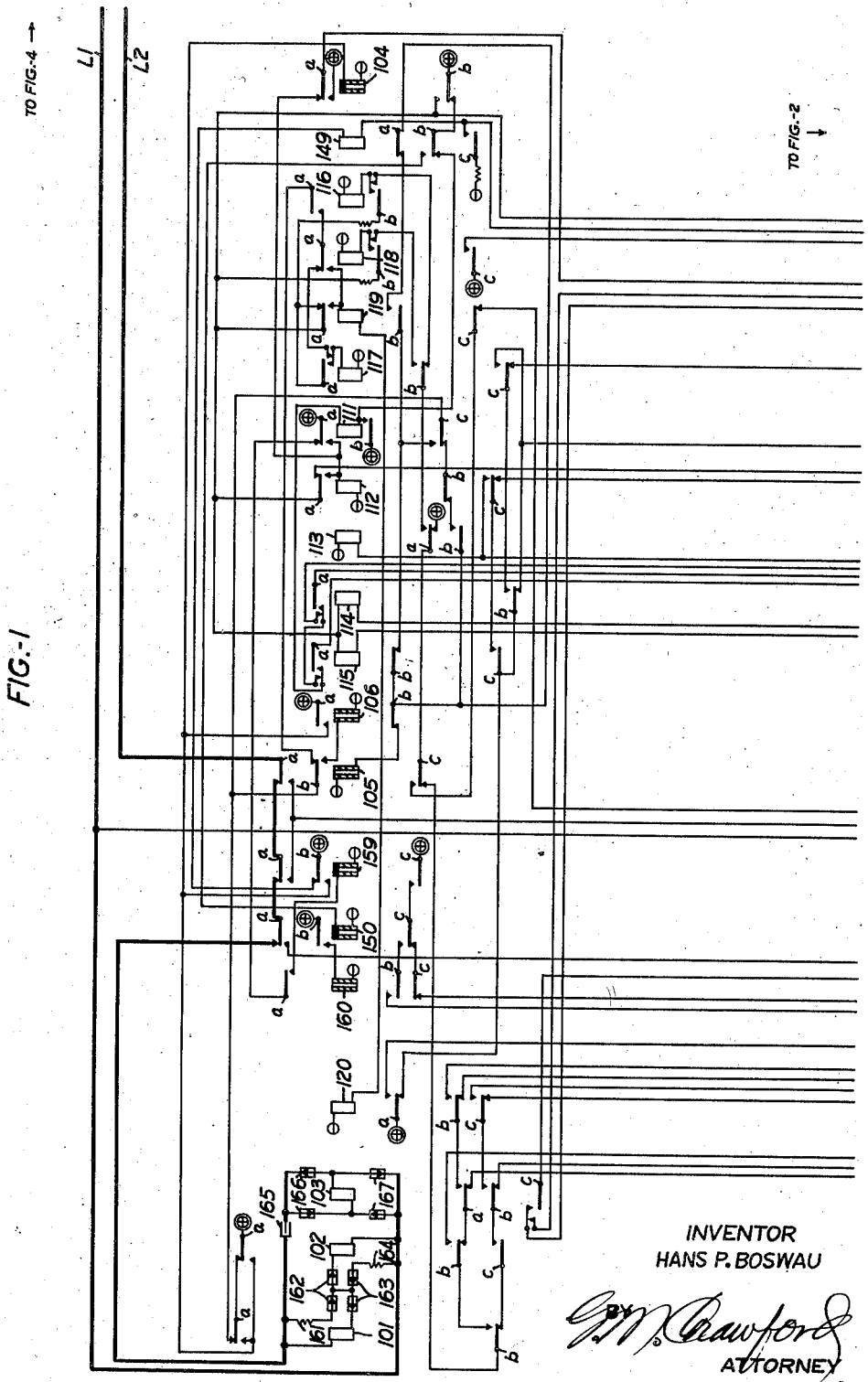
Figure 2:
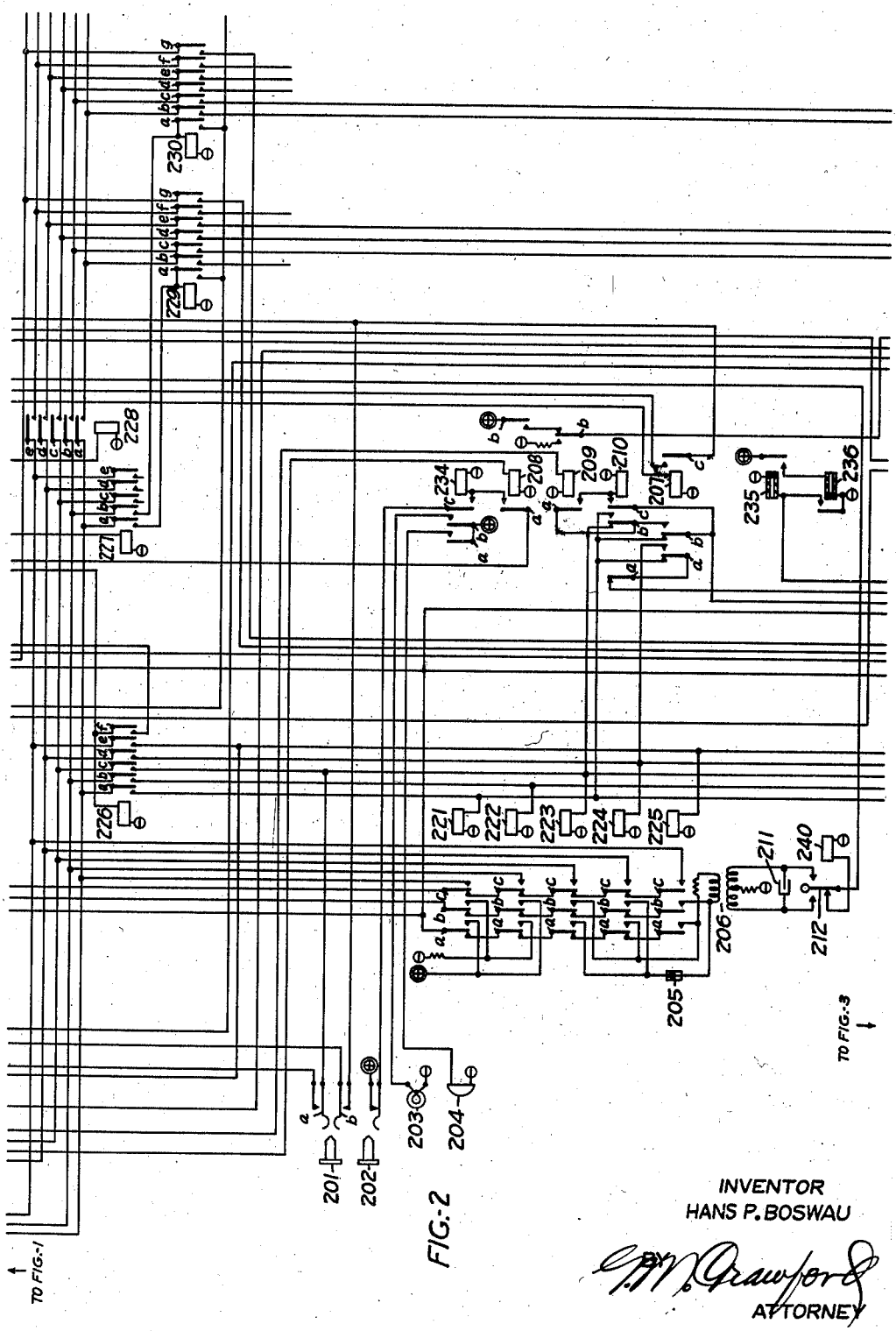
Figure 3:
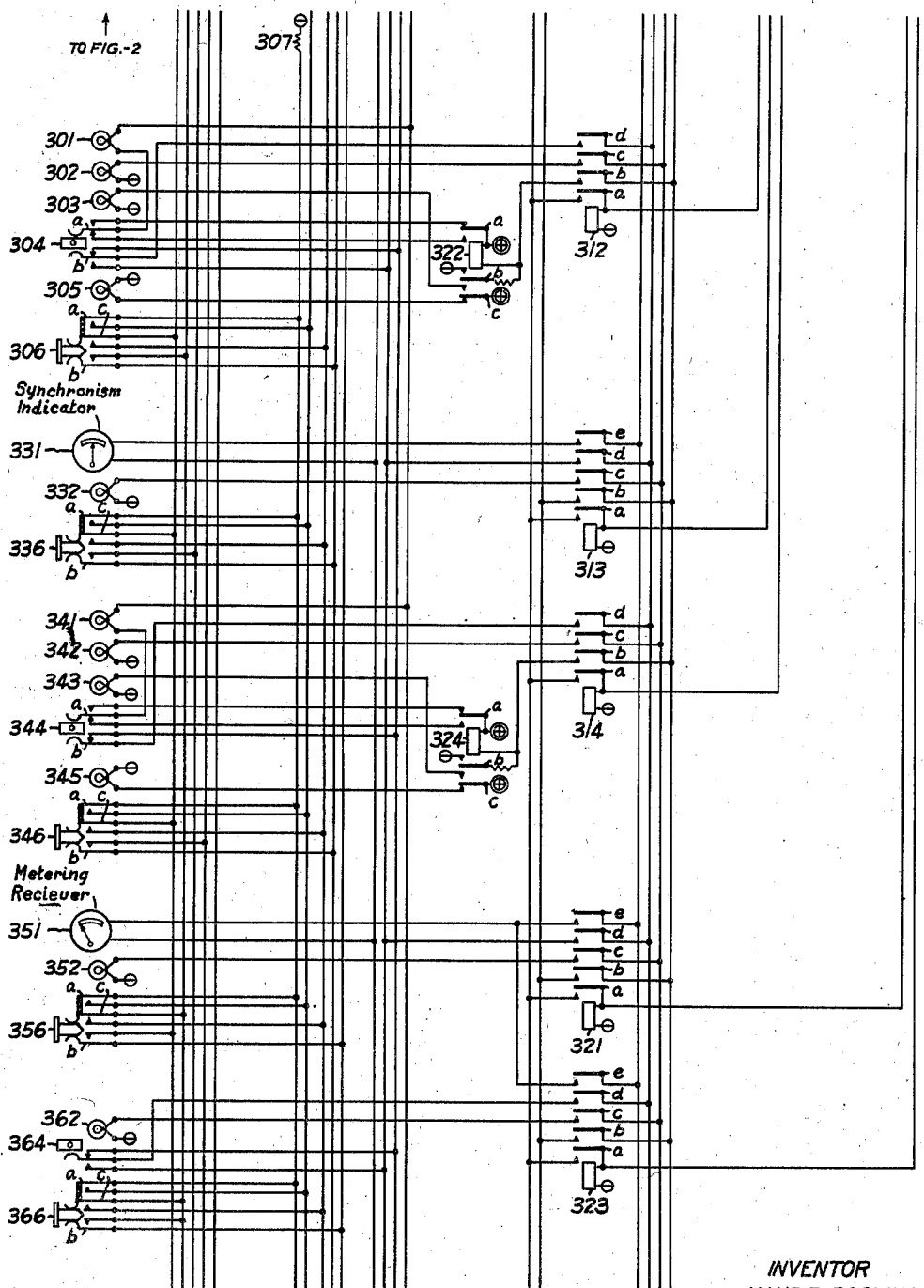
Figure 4:
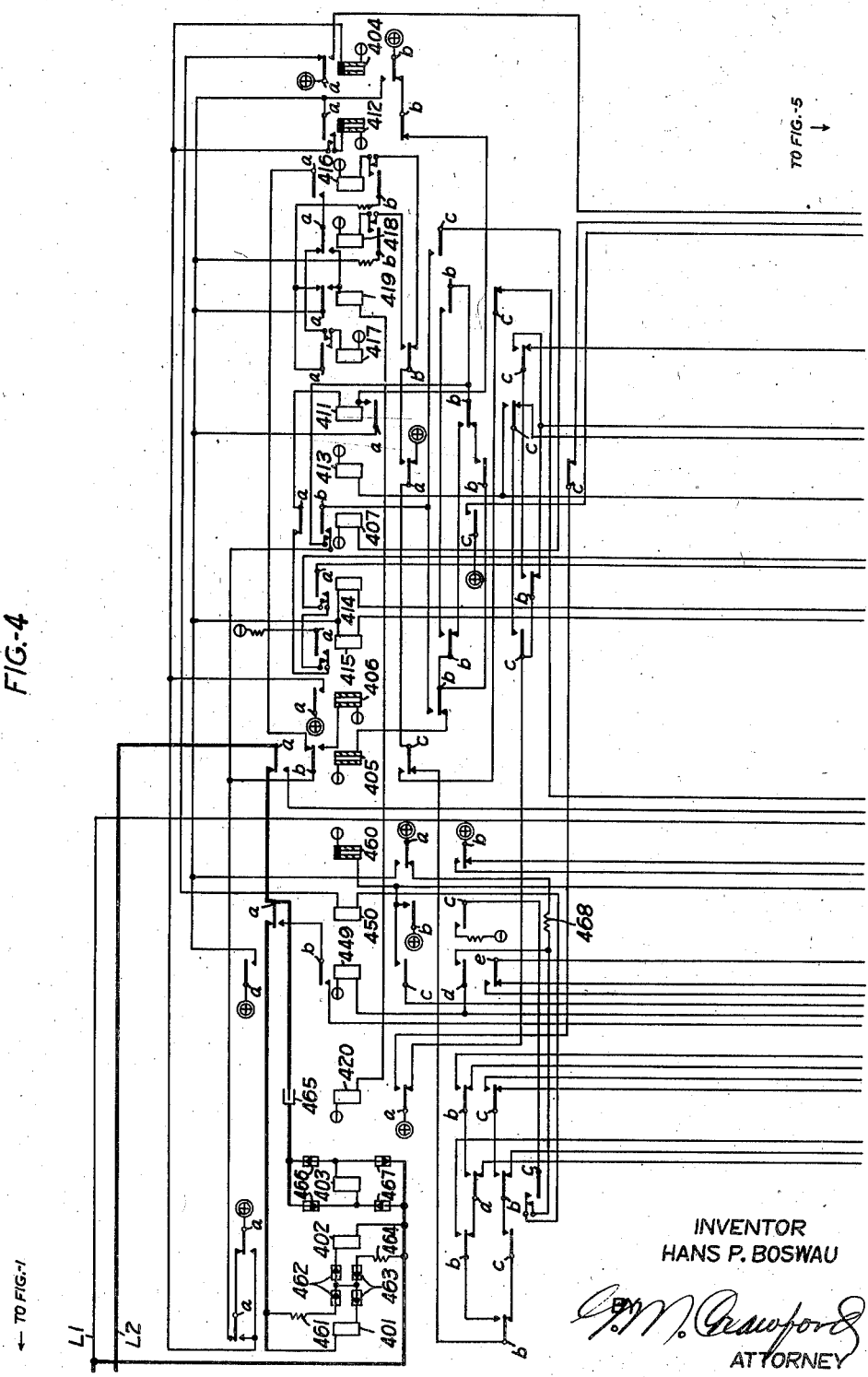
Figure 5:
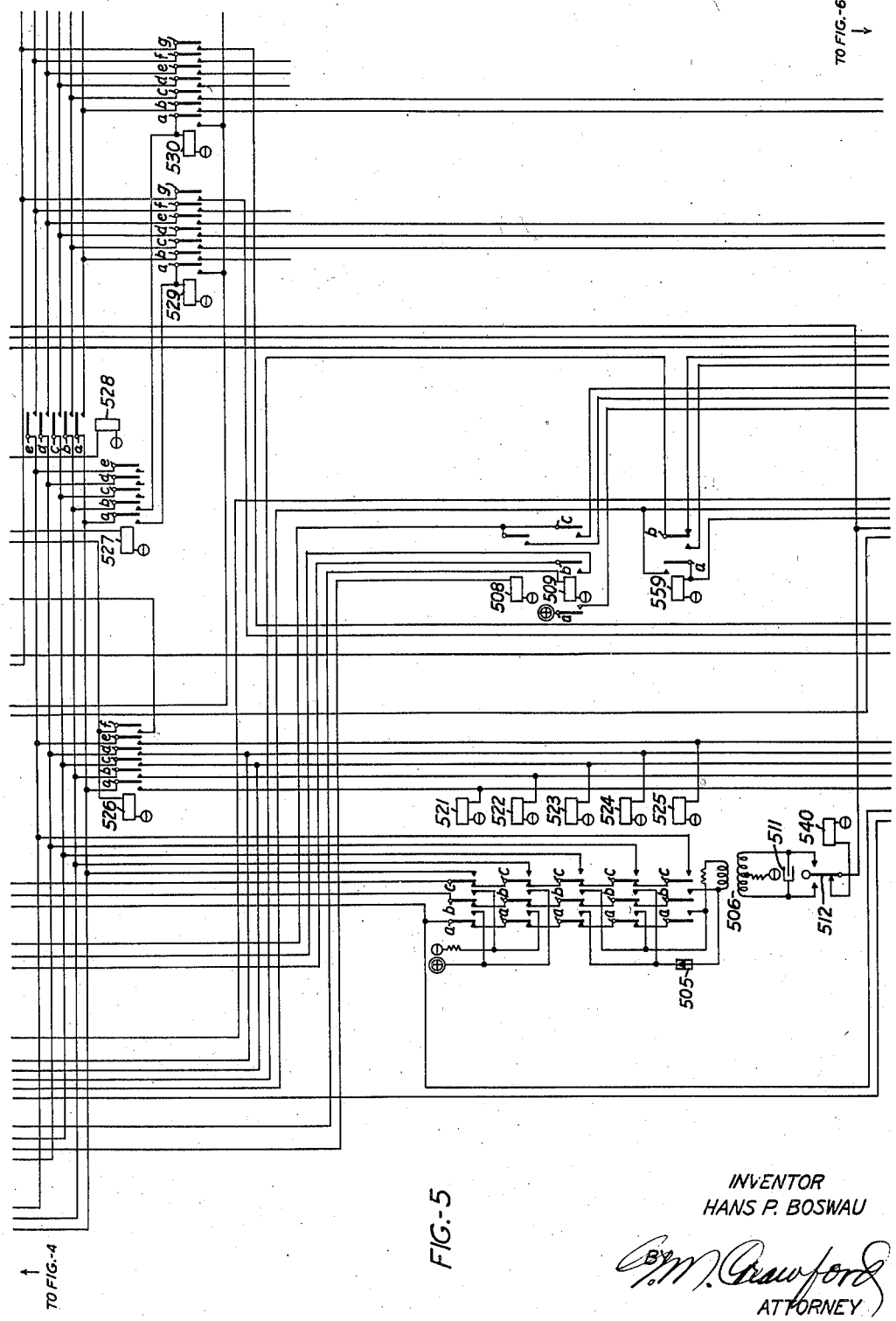
Figure 6:
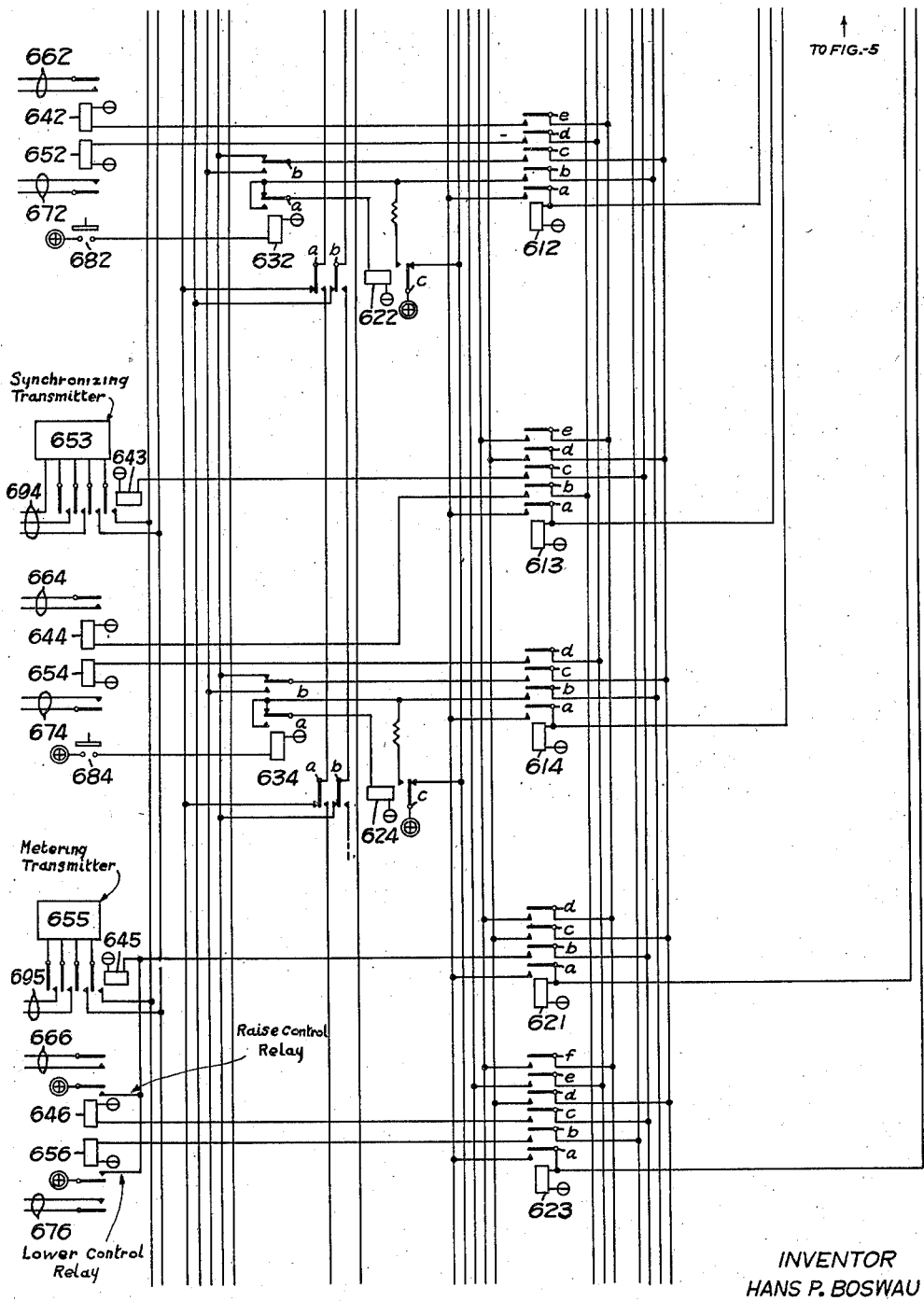

There are other objects of my invention, such as the simplification of circuits, utilizing the same circuits for a plurality of different functions and in inter-related manner which will appear in the following detailed description in connection with the drawings, in which Figures 1 to 3 are the detailed circuit diagrams of the apparatus at the control office and Figures 4 to 6 are the detailed circuit diagrams of the apparatus at a remote substation, the office and substation being connected by two conductors L—I and L—2.

Before describing the circuits in detail a brief description of the principles of my invention will be given, together with a detailed description of the functions of the various apparatus used.

I have discovered novel means for utilizing a code arrangement which comprises five different code combinations suitable for the transmission over a single signalling circuit, namely: a first code consisting of an impulse of continuous direct current of one polarity, a second code consisting of an impulse of continuous direct current of the opposite polarity, a third code consisting of an impulse of rapidly pulsating current of one polarity, a fourth code consisting of an impulse of rapidly pulsating current of the opposite polarity, and a fifth code consisting of an impulse of alternating current. The pulsating currents may be produced for example by passing alternating current through a half-wave rectifier or by superimposing alternating current upon direct current of the same or higher peak voltage. The frequency of the alternating current must be such that each selecting impulse contains at least five or more complete cycles of the alternating current.

These codes are utilized to operate receiving relays at the remote station in five different combinations, thus permitting the selection of one out of a total of five selection points with a single impulse. By adding a second impulse, the selection may be increased to 25 points, etc.

For the line receiving relays I have provided relays arranged in special circuits with rectifiers, so that one line relay, such as relay 101, is responsive only to a continuous direct current impulse of one polarity or to a pulsating current impulse of the same polarity. Line relay 102 is responsive only to a continuous direct current impulse of the opposite polarity or to a pulsating current impulse of this opposite polarity and line relay 103 is responsive to an alternating current impulse or to a pulsating current impulse of either polarity, but not to a continuous direct current impulse of either polarity. It will be understood that an alternating current impulse will operate not only relay 103, but also relays 101 and 102, since the alternating current may be considered as being composed of two pulsating currents of opposite polarity.

Two line conductors, or one line conductor with ground return, extend from the office to the substation and are normally associated at each end with the line receiving relays. Proper circuit connections are provided at each end so that the line conductors may be connected to the code transmitting apparatus at one end and to the line receiving relays at the other end, when code impulses are to be transmitted in one direction, and vice versa for transmitting code impulses in the opposite direction.

For selectively controlling and supervising a breaker at the substation the dispatcher first operates an individual selection key. This sets up conditions at the office for transmitting a plurality of code impulses, for example, one for making a group selection and a second for making a unit selection. The transmitter at the dispatcher's office is then connected to the line conductors while the receiving line relays at the substation are normally connected to the line conductors. Thereupon the group selection code impulse is first transmitted over the line conductors, making a group selection at the substation through the operation of the line receiving relays thereat. Following the transmission of the group selection code impulse, a unit selection code impulse is transmitted from the office and, as in the case of the group selection impulse, the line receiving relays at the substation operate in response to the unit selection code impulse for making a unit selection at the substation. Simultaneously with the transmission of the group and unit selection impulses from the office to the substation, group and unit selection operations of a corresponding character are performed locally at the office and circuits thereat are prepared for comparing the check-back impulses subsequently received from the substation with the selection made locally at the office.

Following the transmission of the group and unit selection impulses from the office to the substation, the transmitter at the office is disconnected from the line and the line receiving relays thereat are associated with the line. At the substation, the line receiving relays are disconnected from the line and the transmitter thereat connected to the line.

Code transmitter relays at the substation have been prepared by the group and unit selection made thereat for controlling the transmission of a check code back over the line to the office. This check code, instead of being transmitted in the order of first group and then unit code as they were received from the office, is reversed, the unit check code being transmitted first and followed by the group check code. At the office, in response to the unit check code, the unit check circuit locally prepared thereat is completed, if it properly compares with the selection locally set up. Similarly, when the group check code is received, the group check circuit is completed, if it properly compares with the group selection locally set up.

If the check codes received back at the office indicate the accuracy of the remote selection, the apparatus is conditioned for transmitting a control code from the office to the substation to operate the selected unit, when the dispatcher operates the master control key.

During the interim between the checking of the remote selection and the operation of the master control key, the selection made at the substation is maintained by a series of intermittent holding impulses transmitted over the line from the dispatcher's office. In the intervals between these holding impulses the substation transmits back to the office supervisory impulses indicating at the office the condition of the selected breaker. These intermittent holding and supervisory impulses will continue indefinitely until the dispatcher either releases the selection key or depresses the master control key. When he depresses the master control key the holding impulses are changed to control impulses transmitted over the line to the substation, which operate the line relays thereat to operate in turn the selected breaker.

Upon operation of the breaker to its new condition, the code of the supervisory impulses transmitted back to the office is changed so as to indicate the new condition of the operated breaker by means of supervisory lamps. The apparatus may then be restored to normal by releasing the selection key.

The function of the more important apparatus in my system will now be described in detail, in the order in which it is operated.

Relay 111 is the start relay which is energized over the contacts of an individual control key, such as 306, in series with one of the code control relays 221 to 225. Relay 111 is originally energized over a back contact of the holding relay 104 which is subsequently energized, but relay 111 is locked independently of relay 104 over its own front contact. Furthermore, the circuit for relay 111 extends over contacts of group and point code control switching relays 114 and 115 but these contacts are make-before-break contacts, so that the relay 111 remains energized as the circuit therefor is switched from one to another of the code control relays. Relay 111 at one of its contacts controls a circuit for the sending relay 105 and at another contact controls the circuit for the meter releasing relay 159. Relay 111 also controls the circuit for the auxiliary start relay 112 which prevents the release of the office except after a code has been completed.

Relays 221 to 225 are the sending code relays. These relays are energized selectively in accordance with the selection key operated for controlling the application of the proper selection and checking codes to conductors L—1 and L—2. Relays 221, 223 and 224 also control codes for holding the substation selection or for closing and tripping the selected breaker.

Relay 240 is a pole-changer for producing pulsating current in the primary of a transformer for generating alternating currents in the secondary thereof.

Relay 105 is the sending relay. At its contacts it completes the circuit from the transmitting system to the line conductors L—1 and L—2 for the transmission of code impulses. At the same time it disconnects the line receiving relays from the line conductors L—1 and L—2. Relay 105 is provided with a number of multiple energizing circuits. It may be energized over contacts of the start relay 111 which is energized to start selective operations from the office, or over contacts of relay 113 which functions to start checking codes from the office and, finally, it may be energized from relay 119 which is energized when the checking operations are completed. Relay 105 is deenergized invariably by a contact of relay 106 which functions in cooperation with relay 105 to terminate the transmission of any code impulse originated by relay 105. Relay 105 is prevented from energizing by contacts of line relays 101 and 102 so that no code may be transmitted from the office while a code is being received from the substation, thus obviating interference between signals.

Relay 229 is the group selection relay for group #1. Relay 230 is the group selection relay of group #2. Additional group selection relays (not shown) are, of course, also used.

Relay 106 is the sending interrupter relay which is energized by relay 105 and which opens the circuit of relay 105 to terminate the transmission of a code impulse. Both relays 105 and 106 are slow relays so that after relay 106 has opened the circuit of relay 105 a sufficiently long interval of time elapses to permit the selections to be completed before relay 105 is deenergized. The slow-releasing feature of relay 106 provides the necessary interval between successive code impulses.

Relay 104 is an extra slow relay which functions as a holding relay for maintaining the selection circuits as long as the system is in operation. This relay is energized over contacts of the line relays or of a relay controlled by the transmitter circuit so that it is energized immediately after the system is started into operation and thereafter remains energized as long as impulses are sent and received. This method of maintaining the selections eliminates the necessity for a special release impulse of a different character for restoring the selections to normal.

Relay 114 is the group switching relay. This relay energizes in series with a group selection relay, such as 229, 230, etc., at the end of the group selection impulse and functions to switch the selection circuits from the group selection relays to the unit selecting relays, such as 312, 313, etc., by closing a circuit for the point control relay 228 while opening the circuit of the group control relay 227. Relay 114 is also provided with a make-before-break contact for switching the sending control circuit through the selection key from the group sending code relay to the point sending code relay.

Relay 227 is the group control relay and will be energized for conditioning the group selection relays 229, 230, etc., for operation either locally in accordance with a group selection code transmitted to the substation, or from the substation in response to a group selection code transmitted therefrom. Relay 228 is the point control relay and will be energized to condition the point selection relays 312, 313, etc., for operation, either locally in accordance with a point selection code transmitted to the substation, or in response to a point selection code received from the substation.

Relay 115 is the point switching relay which is energized in series with one of the point selecting relays, such as 312, 313, etc., at the end of point selection impulse interval. Relay 115 closes the circuit for the relay 113 which prepares the circuit for checking codes and is also provided with make-before-break contacts for switching the start relay circuit from the point sending code relay to a holding circuit.

Relay 113 prepares the office for sending and receiving of check codes. At one of its contacts it completes one of the circuits for the relay 105, in preparation of sending a check code. It also prepares circuits for the relays 116 and 118 so that if the received check code is identified with the selection locally set up these relays will be energized.

Relay 226 is the check code sending control relay. This relay is energized following the energization of the point switching relay 115, but only when the substation is the originating end, and controls circuits to the sending code relays 221 to 225 for the purpose of energizing one of these relays in accordance with the group or unit selection relay, energized in response to selection codes received from the substation. Relays 221 and 225 then transmit check signals back to the substation indicating the selection set up at the office.

Relay 101 is a line relay which is connected across the conductors L—1 and L—2 and in a circuit with the rectifiers 163 so that current can flow only from conductor L—1 to conductor L—2 in this circuit to operate the relay. Relay 102 is also a line relay and connected in a circuit with rectifiers 162 arranged to permit current to flow in this circuit for operating the relay 102 only from conductor L—2 to conductor L—1. Relays 101 and 102 also respond to pulsating currents of the same polarity as the continuous direct current to which they respond. The constants of these relays are such that they are sufficiently slow in releasing to keep their armatures operated in the intervals between the successive pulsations of a pulsating current impulse. As explained above, an alternating current impulse operates both relays 101 and 102.

The center points of the rectifiers 162 and 163 are connected together for the following reasons. When a direct current impulse is sent, for example, through relay 101, the self-inductance of relay 101 will tend to maintain the flow of current for a short interval after the impulse has ceased. When the connection of the center points of rectifiers 162 and 163 is omitted, this inductive current surge flows from the upper end of winding 101 through resistance 161, rectifiers 162, relay 102, resistance 164, rectifiers 163 back to the lower end of winding 101 and may be sufficiently strong to energize relay 102 momentarily. This difficulty is avoided by the connection of the center points of rectifiers 162 and 163, which provides a discharge path for the induction current surge from the upper end of winding 101 through resistance 161, left rectifier 162, center connection, left rectifier 163 back to the lower end of winding 101. It will be seen that this new discharge path does not include the winding 102, so that relay 102 cannot be affected by the inductive current surge. Similar considerations hold true when relay 102 is energized by an impulse of proper polarity.

A condenser 165 is provided between the circuits for relays 101 and 102 and the circuit for the third line relay 103 to prevent direct current impulses from flowing into circuit of the line relay 103. Alternating or pulsating currents may, however, flow through the condenser 165 and rectifiers 166 and 167 and through relay 103 to operate this relay. The rectifiers 166 and 167 are arranged so that alternating current is transformed into full wave rectified current flowing in the same direction through the winding of relay 103. The effect of this arrangement of the line relays 101, 102 and 103 with their associated rectifiers and condenser is that the first code, consisting of direct current passing from L—1 to L—2, will energize relay 101 only, the second code, consisting of direct current passing from L—2 to L—1, will energize relay 102 only, the third code, consisting of pulsating current passing from L—1 to L—2, will energize relays 101 and 103, the fourth code consisting of pulsating current passing from line L—2 to L—1, will energize relays 102 and 103, and the fifth code, consisting of alternating current, will energize relays 101, 102 and 103. The line relays 101, 102 and 103 are normally connected across the lines L—1 and L—2 over the back contacts and armatures of relays 105, 159 and 150. When the dispatcher's office is to function as a transmitter, the relay 105 disconnects the line relays 101, 102 and 103 from the line and connects the office transmitter to the line. Relays 159 and 150 are only energized when remote metering, synchronizing or voltage regulating operations are to be performed, in which case these relays disconnect the line relays 101, 102 and 103 and in place thereof associate volt-meters, ammeters or synchronoscopes with the line as the case may be.

Relay 116 is the point checking relay which is energized when a check code has been received from the substation indicating the point selection made at the substation. If this check code agrees with the local point selection set up at the office, relay 116 energizes and in turn prepares a circuit for the point check switching relay 117.

Point check switching relay 117 is energized following the point check, and switches the check circuits to the group checking relay 118.

Relay 118 is the group checking relay which is energized in response to a check code received from the substation indicating the group selection made at the substation. If this check code agrees with the local group selection set up at the office, relay 118 energizes and prepares a circuit for the group check switching relays 119 and 120. It also closes a circuit for the check signalling lamp at the office to indicate to the dispatcher that a correct selection has been made at the substation.

Group check switching relays 119 and 120 are energized following the point check. Relay 120 opens the circuit of the relay 113 which prepared the system for receiving the check codes. Relay 119 opens the locking circuit for the point checking relay 116 and of the point check switching relay 117. These relays may all be deenergized after the check code has been properly identified. Relay 120 prepares circuits for relays 221, 223 or 224 for controlling the transmission of holding, closing or tripping code signals following the receipt of the check signals.

Relay 208 is the trip supervisory relay which is energized over contacts of line relays 102 and 103, in response to a trip supervisory code received from the substation to control the supervisory lamp relays such as 322, 324, etc.

Relay 209 is the close supervisory relay operated in the same manner as relay 208, except that this relay is operated in response to a closed supervisory code received from the substation.

Relay 210 is an anti-pumping relay, which is energized over contacts of relay 209 in response to the receipt of a close supervisory signal, and prevents the transmission of further operation control codes which would keep the breaker closed in the event that the breaker has been automatically tripped as the result of a short circuit.

Relay 207 is the master control relay controlled by the master control key. The energizing circuit for the relay 207 is completed over a front contact of relay 103 and a contact of the master control key. When the master control key is depressed, relay 207 accordingly will not be immediately energized if a holding pulse is being transmitted at that time, but must await the receipt of an impulse from the substation. This prevents mutilation of the holding code. When a supervisory impulse is received, which in the present embodiment of my invention invariably comprises a pulsating impulse, the line relay 103 at the office is energized to complete the circuit for relay 207. Relay 207 in turn controls the transmission of the breaker operating code.

Relay 234 is an alarm relay, energized in response to a trip supervisory signal to indicate an automatic trip operation received from the substation.

Relay 235 is a disagreement lamp flashing relay which is operated when the individual control key is in disagreement with the condition of the remote unit.

Relay 236 is also a disagreement lamp flashing relay cooperating with relay 235.

Relay 149 is energized to prepare the office for metering.

Relay 150 is energized to switch the circuits to metering.

Relay 159 releases the metering set-up.

Relay 160 is an auxiliary to relay 159. Relays 312, 313, etc., are the point selection relays. Relays 322, 324, etc., are the supervisory lamp relays.

At the substation relays 401 to 406, 413 to 420, 449, 450, 521 to 530 and 549 function in a similar manner to the corresponding relays 101 to 106, 113 to 120, 149, 150, 221 to 230 and 249 at the office.

Relay 407 operates after a supervisory code is transmitted to the office for preventing the substation from transmitting further codes until a code has been received from the office.

Relay 411 is the start relay operating when an operation is started from the substation. Relay 412 is a start delay relay to give the dispatcher preference over any automatic operations originating at the substation.

Relay 460 prepares to release the metering. Relays 612, 613, etc. are the point selection relays.

Relay 508 is a trip control relay, responding to the trip control code from the office to trip the circuit breaker. Relay 509 is a close control relay responding to the close control code from the office to close the breaker.

Relay 559 changes the voltage regulation circuit from raising to lowering.

Relays 622, 624, etc. are the point starting relays functioning to start the substation when an automatic operation occurs, and relays 632, 634, etc. are the point supervisory relays controlled by the circuit breaker.

In order to more clearly explain the invention, the operations which occur when the dispatcher desires to selectively control and supervise a breaker will now be described.

Normally a circuit is completed at the office from positive battery over armature 120—a and its back contact of relay 120, armature 114—b and its back contact of relay 114 and through the winding of relay 227 to negative battery. The energization of relay 227 prepares circuits for the group selection relays 229, 230, etc., which circuits will be completed later by relays 101, 102, and 103, or 221, 222, 223, 224 and 225.

At the substation the relay 527 is normally energized over a similar circuit from positive battery over armature 420—a and its back contact, armature 414—b and its back contact and through the winding of relay 527 to negative battery. At the substation, the point start relays 622, 624, etc., are also energized over obvious locking circuits.

In order to start operations for the purpose of remotely controlling and supervising a circuit breaker, the dispatcher operates a point selection key, such, for example, as the key 306. As a result of the operation of the key 306 a circuit is completed for the relays 111 and 221 in series from positive battery over armature 104—b and its back contact of relay 104, armature 143—b and its back contact, through the winding of relay 111, break contact of armature 115—a, break contact of armature 114—a, through the closed contacts 306—c of key 306, and through the winding of relay 221 to negative battery. Relays 111 and 221 are energized over this circuit. Relay 111, upon energization, locks itself over a circuit from positive battery over armature 111—b and its front contact, through the winding of relay 111, and thence over the circuit including break contact of armature 115—a and break contact of armature 114—a, as traced above, through key 306 and winding 221 to negative battery. A further result of the energization of relay 111 is to complete a circuit for relay 112 from positive battery over armature 111—a and its front contact through the winding of relay 112 to negative battery. A locking circuit is prepared for relay 112 at the front contact of its armature 112—a, but this circuit is not completed at this time.

A further result of the energization of relay 111 is to complete a circuit for the pole-changer 240 from positive battery over armature 111—a and its front contact through back contact and armature 104—a through armature 212 and its back contact and through the winding of pole-changer 240 to negative battery.

The pole-changer 240 is energized over a circuit which is interrupted by its own armature 212, causing this armature to vibrate. The vibrating armature closes a circuit extending from positive battery over armature 111—a and its front contact, and back contact and armature 104—a, through armature 212 and its contacts alternately through one or the other half winding of the primary of the transformer 206, and through a resistor to negative battery. Accordingly, as the pole-changer armature vibrates, current is flowing first in one direction and then in the opposite direction through the primary of transformer 206, inducing an alternating current in the secondary winding. This alternating current is subsequently used for transmission of signalling codes.

A still further result of the energization of relay 111 is the completion of a circuit for the sending relay 105 from positive battery, through armature 102—a and its back contact of relay 102, armature 101—a and its back contact, armature 111—c and its front contact, back contact and armature 115—b, armature 106—b and its back contact through the winding of relay 105 to negative battery. At this time relays 105, 111, 112, 221, 227 and 240 are energized. As a result of the energization of the sending relay 105, a circuit is now completed for the group selection relay 229 of group #1 from positive battery, through back contact and armature 113—a of relay 113, through armature 105—c and its front contact of the energized relay 105, through armature 119—c and its back contact, armature 221—c and its front contact of relay 221, armature 227—a and its front contact through the winding of relay 229 to negative battery. Relay 229, upon energization, functions to select the desired group and prepares a circuit for relay 114 over armature 229—a and its front contact, winding of relay 114 to positive battery supplied over armature 112—a and its front contact and front contact and armature 111—a, but this circuit is not effective at this time due to the bypassing circuit around the winding of relay 114 extending over the original energizing circuit for the relay 229 described above.

A further result of the energization of the sending relay 105 at the office is to control the transmission of the first or group selection code at the front contact of armature 105—a.

Upon energization of the sending code control relay 221, described hereinbefore, a circuit for the transmission of the code was prepared at the front contacts of its armatures 221—a and 221—b. This circuit is now completed upon energization of relay 105, the circuit extending from positive battery at the office over armature 221—a and its front contact over conductor L—1 to the substation, through the resistor 464, rectifiers 463, winding of relay 401 at the substation, back contact and armature 450—a, back contact and armature 405—a over the conductor L—2 back to the office through armature 105—a and its front contact, armature 221—b and its front contact and through a resistor to negative battery.

A further result of the energization of relay 105 is to complete a circuit for the sending interrupter relay 106 from positive battery, through armature 102—a and its back contact of relay 102, armature 101—a and its back contact, armature 105—b and its front contact and through the winding of relay 106 to negative battery. Relay 106, upon energization, completes a circuit for relay 104 from positive battery, through armature 106—a and its front contacts and through the winding of relay 104 to negative battery, and also opens the circuit of sending relay 105 at the back contact of armature 106—b. Relay 104 is a holding relay which is held operated by impulses sent or received and holds the selection relays locked in. At this time, in addition to the relays described above as energized, relays 104, 106 and 229 are energized, and slow-to-deenergize relay 105 is about to drop out, because of its circuit now having been opened.

At the substation, as a result of the energization of relay 401, a circuit is completed for group selection relay 529 of group #1 from positive battery, through back contact and armature 413—a of relay 413, armature 405—c and its back contact, armature 401—b and its front contact, armature 402—b and its back contact, armature 403—a and its back contact, armature 527—a and its front contact and through the winding of the relay 529 to negative battery.

Attention is called to the special circuit arrangement in which the sending code controlling relay 105 at the office not only controls the transmission of a code to the substation, but also makes a corresponding group selection locally at the office by energizing relay 229. This, it will be noted, is made possible by providing multiple energizing circuits for relay 229 at the office and its corresponding relay 529 at the substation.

Tracing the circuit of relay 229 at the office, it will be observed that this circuit may be completed over armature 221—c of relay 221, which is a sending code control relay operated when a code is being transmitted from the office, or relay 229 may be energized over armature 101—b and front contact of the line receiving relay 101, which is operated in response to a code received from the substation.

In the former case, that is when a code is being transmitted, relay 105 is energized and the circuit for relay 229 is completed over the front contact 105—c of that relay. In the latter case, that is, when a code is being received from the substation, the relay 105 is deenergized and the circuit for relay 229 is completed over the back contact 105—c of relay 105. Similar circuit connections prevail for the other group selecting relays 230, etc. Also, at the substation, the corresponding group selecting relays may be energized in response to a code transmitted therefrom or by a code received from the office.

The result of such a circuit arrangement is that upon transmission of a selection code from either the office or the substation, simultaneous selections are made at the transmitting station and at the receiving station which, as will appear in more detail hereinafter, prepare circuits for the check operations to identify the remote selection made at the receiving station.

A result of the energization of relay 401 at the substation is to complete a circuit for the relay 404 from positive battery over armature 402—a and its back contact of relay 402, armature 401—a and its front contact and through the winding of relay 404 to negative battery. Relay 404 is the holding relay and, as will appear in the following, is operated by impulses sent or received and holds the selection relays locked in. In multiple with the relay 404, the relay 412 is energized from positive battery over armature 402—a and its back contact, through armature 401—a and its front contact, through break contact of armature 412—a and through the winding of relay 412 to negative battery. Relay 412 upon energizing, closes a locking circuit for itself over the armature 412—a and its front contact and front contact and armature 404—b to positive battery. Relay 412 is a start delay relay which functions to delay the restarting of the substation after an operation has been completed, for the purpose of giving the dispatcher preference in seizing the line.

Relays 404 and 412 open the circuit of the start relay 411, so that no operation can be originated from the substation until the operation originated at the office is completed. Energization of relay 404 completes a circuit for the pole changer 540 from positive battery over armature 404—a and its front contact, armature 512 and its back contact of pole-changer 540 through the winding of pole-changer 540 to negative battery. The pole-changer 540 functions to produce alternating current in the secondary winding of transformer 506, as described above for the corresponding apparatus at the office.

At the office the slow relay 105 has at this time become deenergized and, accordingly, the locking circuit for the relay 114 in series with relay 229 now becomes effective because of the fact that the original energizing circuit for relay 229 has now been opened at the front contact of the armature 105—c of relay 105.

Deenergization of relay 105 opens the impulse circuit over the conductors L—1 and L—2 traced hereinbefore and deenergizes the relay 401 at the substation. The relay 114 at the office is the group switching relay which, upon energization, prepares the transmission of a second or point selection code. At its break contact of armature 114—a, it opens the circuit for relay 221 which had been energized upon the operation of the key 306. A further result of the energization of relay 114 is the completion of a circuit for relay 222 from positive battery over armature 111—b and its front contact of relay 111, through the winding of relay 111, break contact of armature 115—a, armature 114—a and its front contact, armature 229—g and its front contact, through the contact 306—b of key 306 and through the winding of relay 222 to negative battery. It will be noted that this circuit is completed over the front contact of armature 111—b of relay 111 which, upon its previous energization, was locked over its own armature 111—b and, upon the energization of the relay 114 whose armature 114—a is a make-before-break armature, maintains itself locked over the circuit described above. Relay 222, like relay 221, is a sending code control relay which will control the transmission of the point selection code in the manner to be described hereinafter. A still further result of the energization of relay 114 is to open at armature 114—b the circuit for the group control relay 227 which, as will be recalled, prepared a circuit for a particular one of the group selection relays 229, 230, etc.

A still further result of the energization of relay 114 is to complete a circuit for relay 228 from positive battery over armature 120—a and its back contact of relay 120, armature 114—b and its front contact, armature 117—c and its back contact, and through the winding of relay 228 to negative battery. Relay 228 is the point control relay which, as will be shown in the following, controls the energization of the local point selection relays 312, 314, 321, 322, etc. At this time relays 104, 106, 111, 112, 114, 222, 228, 229 and 240 are energized at the office and a point selection code is about to be transmitted.

The operations thus far performed may now be summarized as follows. Upon the operation of key 306 a circuit was completed for the sending code relay 221 which at its armatures 221—a and 221—b prepared circuits of a predetermined polarity from the positive and negative sides of the battery at the office to the conductors L—1 and L—2. These circuits were subsequently completed upon the energization of relay 105 for the transmission of the group selection code. The energization of the start relay 111 in series with the sending code control relay 221 had completed a circuit for the auxiliary start relay 112. The sending code relay 221, in addition to controlling the code impulse transmitted over the conductors L—1 and L—2, also prepared at its armature 221—c a circuit for the local group selection relay 229 of group #1 to prepare a group selection at the office.

The energization of the relay 105, which, as will be recalled, controlled the transmission of the group selection code, energizes the relay 106 which in turn opens the circuit for relay 105 to terminate the transmission of this group selection code. Relay 106 also completes a circuit for the holding relay 104, which functions to hold the selection relays locked. Group selection relay 229 locks in series with relay 114 after the group selection code has been terminated by the deenergization of the relay 105 and relay 114, upon energizing, in turn deenergizes the sending code relay 221 and energizes in its place the sending code relay 222 in preparation of the transmission of the units or point selection code.

At the substation the receipt of the group selection code impulse had energized the relay 401 which in turn energized the group selection relay 529 for group #1 and also the holding relay 404 which provided a locking circuit for the relay 529 in series with the relay 414 when the relay 401 was subsequently dropped out at the termination of the group selection code. A circuit was also completed for the start delay relay 412.

Following the energization of the relay 414 at the substation the group control relay 527, which is normally energized when the set is in non-operating condition, is deenergized and a circuit is completed for the point control relay 528 from positive battery over armature 420—a and its back contact of relay 420, armature 414—b and its front contact, armature 417—c and its back contact and through the winding of relay 528 to negative battery. At the substation there are energized at this time relays 404, 412, 414, 528, 529 and 540.

Returning again to the office, where a point selection code has been prepared for transmission to the substation upon the deenergization of the slow sending relay 105 following the transmission of the group selection code, the circuit for the slow relay 106 was opened at the armature 105—b of relay 105. Slow relay 106 drops out after an interval and again completes the circuit for the relay 105. Relay 105 again energizes over the circuit traced hereinbefore and at its armature again completes the transmission of a code, this time a point selection code, over conductors L—1 and L—2. Inasmuch as the relay 221 is now dropped out and in place thereof the relay 222 is energized, positive battery, instead of being applied to conductor L—1 over the armature 221—a and its front contact of relay 221, is applied to the conductor L—2 over the armature 222—b and its front contact of relay 222. Negative battery, instead of being applied over the armature 221—b and its front contact to the conductor L—2, is applied over the armature 222—b and its front contact of relay 222 to the conductor L—1. Accordingly, an impulse of the reverse polarity is transmitted for making the point selection. At the office, in response to the energization of relays 228, 222 and 105, a circuit is completed for the point selection relay 312 from positive battery through back contact and armature 113—a, armature 105—c and its front contact, armature 119—c and its back contact, armature 221—c and its back contact, armature 222—c and its front contact, armature 228—b and its front contact, through armature 229—c and its front contact, through the winding of the point selection relay 312 to negative battery. Relay 312 energizes and prepares a locking circuit for itself in series with relay 115, which becomes effective at a later stage.

A further result of the energization of relay 105 is to complete a circuit again for the slow relay 106 which at its armature 106—b opens the circuit for the slow relay 105 and the relay 105 will drop out after an interval of time during which the operations about to be described will be completed.

At this time relays 104, 105, 106, 111, 112, 114, 222, 228, 229, 240 and 312 are energized at the office.

Referring now to the operations at the substation in response to the receipt of the point selection code, it will be recalled that, as distinguished from the group selection code, positive battery was applied to the conductor L—2 and negative battery was applied to conductor L—1. The arrangement of the rectifiers 462 and 463 is such that current in this direction can pass only through the line relay 402 at the substation. At this time relays 402, 404, 412, 414, 528, 529 and 540 are energized at the substation and a circuit is completed for the point selection relay 612 from positive battery through back contact and armature 413—a, armature 405—c and its back contact, armature 401b and its back contact of relay 401, armature 402—c and its front contact of relay 402, armature 403—b and its back contact, armature 528—b and its front contact, armature 529—c and its front contact through the winding of relay 612 to negative battery. Relay 612 energizes and prepares a locking circuit for itself in series with relay 415, which, however, is not effective at this time due to the by-passing circuit around the winding of relay 415 over the original energizing circuit for relay 612 traced above. After an interval of time, however, the point selection code impulse transmitted from the office is terminated upon the deenergization of relay 105 and the circuit for relay 402 is accordingly opened. Relay 402, upon deenergization, opens the original energizing circuit for the relay 612 and the locking circuit is thereupon completed for the relays 612 and 415 in series from positive battery over armature 404—b and its front contact of relay 404 through the winding of relay 415, front contact and armature 612—a through the winding of relay 612 to negative battery. Relay 415 is the point switching relay which completes a circuit for check sending control relay 526 from positive battery over armature 420—a and its back contact of relay 420, armature 415—c and its front contact, armature 411—c and its back contact through the winding of relay 526 to negative battery. Relay 526, as will appear hereinafter, now functions to control the transmission of a check code back to the office.

At the office, it will be recalled that the last operation described was the energization of relay 106 which opened the circuit of the slow relay 105. After the slow relay 105 drops out, the locking circuit is completed for the relay 312 in series with the relay 115 from positive battery over armature 104—b and front contact of relay 104, through the winding of relay 115, front contact and armature 312—a through the winding of relay 312 to negative battery. Relay 115 is the point switching relay which, upon energization, prevents the transmission of further selection codes.

As a result of the energization of point switching relay 115 the circuit for the relay 222 is opened at the armature 115—a of relay 115 and relay 222 is thereupon deenergized. Relay 111, however, remains energized over a circuit from positive battery, armature 111—b and its front contact, winding of relay 111, armature 115—a and its front contact, and contact 306—a of key 306, to negative battery through resistor 307. A further result of the energization of relay 115 is to complete a circuit for relay 113 which prepares the system for the checking code to be received from the substation. The circuit for the relay 113 may be traced from positive battery over armature 120—a and its back contact, armature 115—c and its front contact, armature 112—c and its front contact, through the winding of relay 113 to negative battery. By this time the slow relay 106, the circuit of which was opened upon deenergization of the relay 105, is also deenergized.

It will be recalled that the substation had prepared itself for the transmission of a check code to indicate at the office the selection made at the substation in response to the selection code transmitted from the office. The check sending control relay 526 has been described already as being energized as a result of the energization of the point switching relay 415.

Upon the energization of relay 526 a circuit is completed for relay 413 in multiple with the relay 526 from positive battery over armature 420—a and its back contact, armature 415—c and its front contact, armature 411—c and its back contact, armature 526—f and its front contact and through the winding of relay 413 to negative battery.

Energization of relay 526 also completes a circuit for sending code relay 522 in multiple with relay 612 from positive battery through armature 404—b and its front contact of relay 404, winding of relay 415, front contact and armature 612—a, front contact and armature 529—c, front contact and armature 528—b, armature 526—b and its front contact and through the winding of relay 522 to negative battery. The particular sending code relay, such as 522, which is energized at this time is determined, it will be noted, by the particular point selection relay 612 which was energized in response to the point selection code received from the office so that the check code transmitted to the office will indicate the particular point selection which has been made at the substation.

As in the case of the corresponding relays at the office, relay 522 at the substation will control at its armatures 522—a and 522—b the particular polarity to be impressed upon the conductors L—1 and L—2 from the substation. At this time relays 404, 412, 413, 414, 415, 522, 526, 528, 529, 540 and 612 have been energized at the substation. A circuit is now completed for the slow relay 405 in response to the energization of relay 413 described above. This circuit extends from positive battery over armature 402—a and its back contact of relay 402, armature 401—a and its back contact break contact of armature 407—b, armature 411—b and its back contact, front contact and armature 413—b, armature 406—b and its back contact and through the winding of relay 405 to negative battery.

Relay 405, upon energization, completes the impulsing circuit for the code to be impressed upon the conductors L—1 and L—2. This circuit extends from positive battery over front contact and armature 522—b of relay 522, back contact and armature 521—b, front contact and armature 405—a to the conductor L—2, while negative battery is applied through a resistor over front contact and armature 522—a, back contact and armature 521—a to the conductor L—1.

A further result of the energization of relay 413 and the energization of relays 405 and 522 is to complete a circuit for the point checking relay 416 from positive battery over armature 404—b and its front contact of relay 404 through the winding of relay 415, front contact and armature 612—a, front contact and armature 529—c, front contact and armature 528—b, front contact and armature 522—c, back contact and armature 521—c, back contact and armature 419—c, front contact and armature 405—c, armature 413—a and its front contact, armature 417—b and its back contact, break contact of armature 416—b, and through the winding of relay 416 to negative battery. Relay 416 closes a locking circuit for itself over armature 416—b and its front contact, back contact and armature 419—a to positive battery over armature 404—b and its front contact. This point checking relay 416 controls the functions to be described in detail hereinafter.

As a result of the energization of relay 405 at the substation a circuit is completed for relay 406 from positive battery over armature 402—a and its back contact, armature 401—a and its back contact, armature 405—b and its front contact, and through the winding of the slow relay 406 to negative battery. Slow relay 406, upon energizing, opens the circuit of relay 405 to terminate the checking code impulse. Relay 405 is a slow-to-deenergize relay and will remain energized during the period while the operations in response to the receipt of the check code occur at the office.

At the office, in response to the particular polarity of the impulse transmitted over conductor L—1 and L—2, a circuit is completed through the relay 102 thereat. This is because of the fact that the rectifiers 162 and 163 are so arranged that only current flowing in the direction indicated will flow through the winding of relays 101 and 102.

This circuit is completed from conductor L—2 through armature 105—a and its back contact, armature 159—a and its back contact, armature 150—a and its back contact, resistor 161, rectifiers 162 and through the winding of relay 102 to the conductor L—1.

Relay 102, upon energization, completes a circuit for the point checking relay 116 at the office from positive battery over armature 104—b and its front contact of relay 104, through the winding of relay 115, front contact and armature 312—a, front contact and armature 229—c, front contact and armature 228—b, back contact and armature 103—b, front contact and armature 102—c, back contact and armature 101—b, back contact and armature 105—c, armature 113—a and its front contact, armature 117—b and its back contact, break contact of armature 116—b, and through the winding of relay 116 to negative battery. It should be noted that the point checking relay 116 finds a circuit for itself only if the negative line relay 102 at the office is energized in response to the checking code, which circuit was prepared by the energization of the point selection relay 312 when the point selection was made at the office and its completion at this time by the energization of the negative line relay 102 indicates a correct point selection at the substation. At this time the relays 102, 104, 111, 112, 113, 114, 115, 116, 228, 229, 240 and 312 are energized at the office.

Referring now to the substation, upon energization of the slow relay 406, the circuit for relay 405 was opened. Relay 405 is a slow-to-deenergize relay and remains energized while the above described operations occur at the office. Relay 405 now deenergizes, however, and a circuit is thereupon completed for the check switching relay 417 from positive battery over armature 402—a and its back contact, armature 401—a and its back contact, armature 405—b and its back contact, armature 416—a and its front contact, armature 418—a and its back contact, break contact of armature 417—a through the winding of relay 417 to negative battery. Energization of relay 417 opens the circuit for relay 528 at its armature 417—c and relay 528 is deenergized.

It should be noted at this time, that while the substation selection was made by the transmission of a group selection followed by the transmission of a point selection, the checking operations of this selection are in the reverse order, i. e., the point selection is first checked and thereafter the group selection is checked.

Energization of relay 417, in addition to deenergizing the relay 528, energizes the group control relay 527 over a circuit from positive battery through armature 420—a and its back contact, armature 414—c and its front contact, armature 417—c and its front contact, and through the winding of relay 427 to negative battery. As a result of the deenergization of relay 528, the circuit of the sending code control relay 522 is opened and this relay is deenergized. At this time the relays 404, 406, 412, 413, 414, 415, 416, 417, 526, 527, 529, 540 and 612 are energized at the substation and a circuit is completed for relay 521 from positive battery over armature 404—b and its front contact, through the winding of relay 414, front contact and armature 529—a, front contact and armature 527—a, armature 526—a and its front contact through the winding of relay 521 to negative battery. Relay 521, like relay 522, controls the transmission of a particular polarity over the conductors L—1 and L—2, but the polarity is reversed from that controlled by the relay 522, thus negative battery at the substation is applied over the armature 521—b and its front contact, front contact and armature 405—a of relay 405, when this latter relay is energized as will now be described, to the conductor L—2. Positive battery is applied to the conductor L—1 over front contact and armature 521—a.

At this time the slow relay 406 has dropped out and a circuit is again completed for relay 405, as described hereinbefore. Energization of relay 405 completes the transmission of the group check code of predetermined polarity over conductors L—1 and L—2. Energization of the relay 405 also completes a circuit for the group checking relay 418 from positive battery over armature 404—b and its front contact through the winding of relay 414, front contact and armature 529—a, front contact and armature 527—a, front contact and armature 521—c, back contact and armature 419—c, front contact and armature 405—c, armature 413—a and its front contact, armature 417—b and its front contact, break contact of armature 418—b and through the winding of relay 418 to negative battery.

Relay 418, upon energization, completes a locking circuit for itself from positive battery over armature 404—b and its front contact and through a resistor and front contact and armature 418—b. As a further result of the energization of relay 405, relay 406 is energized over the circuit which has been traced before and this relay in turn opens the circuit of the relay 405. Relay 405, however, is a slow-to-deenergize relay and will not deenergize until the operations described have been completed at the office. A further result of the energization of relay 418 is to complete a circuit for relay 407 from positive battery over armature 402—a and its back contact, armature 401—a and its back contact, break contact of armature 407—b, armature 411—b and its back contact, front contact and armature 413—b, armature 406—b and its front contact, front contact and armature 418—c and through the winding of relay 407 to negative battery. Relay 407 locks itself over its own armature 407—b and front contact. Relay 407, upon energization after the transmission of the group check code, prevents the substation from transmitting any further codes to the office until the office has transmitted some code back to the substation.

At the office, following the termination of the point check code upon the first deenergization of relay 405 at the substation, the negative line relay 102 is deenergized. At this time relays 104, 111, 112, 113, 114, 115, 116, 228, 229, 240 and 312 are energized at the office. A circuit is now completed for the check switching relay 117 at the office to switch from the point check to the group check. This circuit extends from positive battery over armature 102—a and its back contact, armature 101—a and its back contact, armature 105—b and its back contact, armature 116—a and its front contact, armature 118—a and its back contact, break contact of armature 117—a and through the winding of the check switching relay 117 to negative battery. Check switching relay 117, upon energization locks itself from positive battery over armature 104—b and its front contact, armature 119—a and its back contact, front contact and armature 117—a, and through the winding of relay 117 to negative battery. Relay 117, upon energizing, conditions the office for the receipt of the group checking code. Upon energization of relay 117 the circuit for the point control relay 228 is opened at the armature 117—c of relay 117 and relay 228 deenergizes. A further result of the energization of relay 117 is to complete a circuit for the group control relay 227 from positive battery over armature 120—a and its back contact, armature 114—b and its front contact, armature 117—c and its front contact and through the winding of relay 227 to negative battery.

After these operations are completed, the substation transmits the group check code in the manner described above and the polarity impressed upon the conductors L—1 and L—2 is such that current can flow only in the circuit including relay 101. Relay 101 is accordingly energized. At this time relays 101, 104, 111, 112, 113, 114, 115, 116, 117, 227, 229, 240 and 312 are energized at the office. The energization of relay 101 completes a circuit for the group checking relay 118 from positive battery over armature 104—b and its front contact, winding of the relay 114, front contact and armature 229—a, front contact and armature 227—a, back contact and armature 103—a, back contact and armature 102—b, front contact and armature 101—b, back contact and armature 105—c, armature 113—a and its front contact, armature 117—b and its front contact, break contact of armature 118—b and through the winding of relay 118 to negative battery.

It should be noted that this circuit depends for its completion upon the receipt of the proper group checking code which energizes the relay 101. The energization of the group selection relay 229 prepared the above circuit for the relay 118 and only upon the receipt of the proper code to complete this circuit at the armature of relay 101 is the relay 118 energized. As a result of the energization of the group checking relay 118 the check lamp 302 is illuminated over a circuit from positive battery, through the armature 118—c and its front contact, armature 312—c and front contact of relay 312 and through the lamp 302 to negative battery. This lamp is individual to this particular selection and gives an indication that the checking codes received from the substation have been properly compared with the selection set up at the office, thus assuring the operator that the selection at the substation is correct.

At the substation the slow relay 405 is by this time deenergized as a result of the energization of relay 406 and relays 404, 406, 407, 412, 413, 414, 415, 416, 417, 418, 521, 526, 527, 529, 540 and 612 are at this time energized. Upon deenergization of relay 405 the final checking relays 419 and 420 are energized in series from positive battery over armature 402—a and its back contact, armature 401—a and its back contact, armature 405—b and its back contact, armature 416—a and its front contact, armature 418—a and its front contact and through the windings of relays 419 and 420 to negative battery. Energization of the relay 419 opens the checking circuit at armature 419—c and also opens the locking circuit for relays 416 and 417 and these relays are deenergized. Relay 419 also closes a locking circuit for itself and for relay 420 over front contact and armature 419—a. Energization of relay 420 opens the circuits of relays 413, 526 and 527 all of which find their circuits over the back contact of armature 420—a of relay 420. Deenergization of relay 526 in turn opens the circuit for relay 521 at the substation.

A result of the deenergization of relay 413 is to complete a circuit for relay 524 from positive battery over armature 420—a and its front contact, armature 413—c and its back contact, armature 612—c and its front contact, armature 632—b and its back contact, and through the winding of relay 524 to negative battery. It is to be noted that this circuit includes the back contact 632—b of relay 632, which is controlled by the condition of its associated circuit breaker, being deenergized when the breaker is tripped. When the breaker is closed relay 632 is energized and the above traced circuit will energize relay 523 over front contact 632—b, instead of relay 524 over back contact 632—b. In the meantime the slow relay 406 has deenergized because of the previous deenergization of the relay 405. Relays 404, 407, 412, 414, 415, 418, 419, 420, 524, 529, 540 and 612 are now energized at the substation.

At the office, following the completion of the group selection code which energized the relay 118, the positive line relay 101 deenergizes and closes a circuit for the final checking relays 119 and 120 from positive battery, armature 102—a and its back contact, armature 101—a and its back contact, armature 105—b and its back contact, armature 116—a and its front contact, armature 118—a and its front contact and through the windings of relays 119 and 120 to negative battery. Relay 119, upon energization, opens the locking circuit for relays 116 and 117 and these relays deenergize. As a result of the energization of relay 120, the relays 113 and 227, which find their energizing circuits over the back contact and armature 120—a of relay 120, are deenergized. A circuit is now completed for the sending code control relay 221 from positive battery over the armature 120—a at its front contact, through armature 312—d and its front contact, the back contact 304—b of the control key 304, back contact and armature 210—a, armature 207—a and its back contact, through the winding of relay 221 to negative battery.

A further result of the energization of relay 119 is to complete a circuit for relay 105 from positive battery over armature 102—a and its back contact, armature 101—a and its back contact, armature 111—c and its front contact, armature 119—b and its front contact, back contact and armature 149—a, armature 106—b and its back contact, and through the winding of relay 105 to negative battery.

Relay 105 energizes to transmit a holding pulse to the substation which serves to maintain the selection thereat. It will be recalled that the sending code control relay 221 was energized just preceding the energization of relay 105 and, as in the case of the selection code operations described before, prepares a circuit for impressing current of a predetermined polarity upon the conductors L—1 and L—2. This circuit is now completed upon the energization of relay 105 and current flows over the line of such polarity that it can flow only through relay 401 at the substation. Relay 401 is thereupon energized and at this time relays 401, 404, 407, 412, 414, 415, 417, 418, 419, 420, 524, 529, 540 and 612 are energized. Upon energization of the relay 401 the locking circuit for relay 407 is opened and this relay is de-energized to permit the transmission of a supervisory signal from the substation.

At the office, following the energization of relay 105, a circuit is completed for relay 106, as has already been described, which in turn opens the circuit for relay 105. After an interval of time relay 105 de-energizes and terminates the holding pulse. The system is then in condition for the receipt of a supervisory code indicating the condition of the selected breaker. Relay 106 de-energizes shortly thereafter.

Upon the de-energization of relay 105 at the office the holding impulse transmitted over the conductors L—1 and L—2 terminates and relay 401 at the substation is de-energized, closing a circuit for relay 405 from positive battery over armature 402—a and its back contact, armature 401—a and its back contact, armature 407—b and its back contact, armature 419—b and its front contact, front contact and armature 415—b, armature 406—b and its back contact, and through the winding of relay 405 to negative battery. Relay 405 energizes and in turn completes a circuit for relay 406 as traced hereinbefore. Energization of relay 406 opens the circuit of the slow relay 405 which, however, does not de-energize immediately, and also completes a circuit for the relay 407 as traced before.

It will be recalled that, following the transmission of the check code impulses, the sending code control relay 524 was energized over a circuit controlled by the condition of the selected breaker at the substation. When the relay 405 at the substation now energizes, the code selected by energizing relay 524 is transmitted over the conductors L—1 and L—2. In the present case this code comprises an impulse of rectified half-wave pulsations from the source of alternating current at the transformer 506 and the circuit extends from the secondary winding of transformer 506 through rectifier 505, front contact and armature 524—b, back contacts and armatures 523—b, 522—b and 521—b, front contact and armature 405—a over conductor L—2 to the office, through armatures and back contacts 105—a, 159—a and 150—a, resistor 161, rectifiers 162, winding of relay 102, over conductor L—1 back to the substation, through armatures and back contacts 521—a, 522—a and 523—a, armature 524—a and its front contact, and through a resistor back to the secondary winding of the transformer 506.

The rectifier 505 permits only one polarity of the alternating current to pass, thus producing a flow of pulsating current in the circuit described. This pulsating current flowing in the described direction, is received at the office and can only flow in the circuit of relay 102 which is accordingly energized. Being of a pulsating character, the impulse also passes through the condenser 165, which does not pass a continuous direct current impulse, and flows in the circuit of relay 103 over the full-wave rectifiers 166 and 167, in multiple with the circuit for relay 102. Relays 102 and 103 are therefore energized at the office. As a result, the trip supervisory relay 208 is energized over a circuit from positive battery over back contact and armature 113—a, armature 105—c and its back contact, armature 101—b and its back contact, armature 102—c and its front contact, armature 103—b and its front contact, armature 120—c and its front contact and through the winding of the relay 208 to negative battery.

It will be noted that this circuit depends for its completion upon the energization of the final checking relay 120 and also upon the receipt of the proper supervisory code which will energize both the line relay 102 and the line relay 103. The other supervisory code, indicating a closed breaker, would have energized the closed supervisory relay 209. The energization of relay 208 completes a short-circuit around the supervisory lamp relay 322 from positive battery over armature 208—b and its front contact, back contact and armature 209—b, armature 312—b and its front contact to one side of the winding of relay 322, the other side of which is connected to positive battery. As a matter of fact, the supervisory lamp relay 322 had been de-energized in a previous operation due to the fact that the breaker is assumed to be tripped and a circuit had been completed for the green supervisory lamp 305, indicating a tripped condition of the breaker, from positive battery, armature 322—c and its back contact, through the green lamp 305 to negative battery.

At the end of the supervisory code impulse, terminated by the de-energization of relay 405 at the substation, the relays 102 and 103 at the office are de-energized and in turn de-energize the trip supervisory relay 208. A circuit is now completed again at the office for relay 105 as traced before. At the substation the relay 405 has in turn de-energized the relay 406.

Energization of relay 105 at the office causes the transmission of another holding impulse in the manner already described in detail above, which is followed by the transmission of a trip supervisory code signal from the substation. These operations are repeated indefinitely as long as no action on the part of the operator takes place, or as long as the selected breaker does not change its condition.

In order to close the breaker, the dispatcher turns the individual control key 304 from the trip position shown in the drawings to the close position and then operates the master control key 201 until he is advised by the changing of the supervisory lamps that the desired operation has taken place.

When the control key 304 is turned to the close position, the disagreement lamp 301 begins to flash and continues to do so until the control key 304 is again brought into agreement with the position of the associated breaker as indicated by its supervisory lamp relay 322. Turning of the key 304 closes a circuit for the lamp 301 and relay 235 in series from positive battery over armature 322—a and its back contact, front contact 304—a of key 304, lamp 301, and winding of relay 235 to negative battery. The winding of relay 235 is of sufficiently high resistance so that lamp 301 will not glow in series with it, but relay 235 will operate in series with the lamp 301 and close an obvious circuit for relay 236 which in turn short-circuits the winding of relay 235. This causes the lamp 301 to glow with full brilliancy and de-energizes slow relay 235. After an interval of time slow relay 235 releases, in turn de-energizing slow relay 236, which also releases after a short time, causing the cycle of operations to be repeated with the result that the disagreement lamp 301 is caused to flash.

The circuits are so arranged that the operation of the master control key 201, during the time a holding impulse is being transmitted from the office, does not immediately change the holding impulse to a control impulse, but awaits the receipt of the next supervisory code from the substation, so as to prevent any possible mutilation of the holding impulse.

Assuming that at the instant the dispatcher depresses his master control key 201, supervisory signals are being received from the substation, and relays 102 and 103 are energized, the dispatcher obtains control of the system by the energization of the relay 207. The circuit for the relay 207 is completed from positive battery over armature and front contact 104—b, contact 201—b of master control key 201, front contact and armature 103—c, and through the winding of relay 207 to negative battery. The sending code control relay 221 which was energized over back contact 207—a is now de-energized and the circuits are changed from a holding code to the transmission of a closing code by the energization of the relay 223 over a circuit from positive battery, armature 120—a and its front contact, armature 312—d and its front contact, through front contact 304—b of key 304, armature 207—b and its front contact, armature 210—b and its back contact and through the winding of relay 223 to negative battery.

Relays 102 and 103 will now de-energize, following the de-energization of relay 405 at the substation, and a circuit is thereby completed for the relay 105 as described before. Relay 105 upon energization, completes the circuit for the transmission of a closing code, the code character of which is determined by the energization of the relay 223. This code comprises a pulsating current in a pre-determined direction impressed upon conductors L—1 and L—2, the circuit being an exact duplicate of that described above for the supervisory code, except that the polarity of the pulsating current is reversed. This pulsating current is in such a direction that it can flow only in the circuit of the relay 401 at the substation and, being of a pulsating character, also passes through the condenser 465 and over the full-wave rectifiers 466 and 467 through the winding of relay 403, in parallel with relay 402.

Relays 401 and 403 at the substation are accordingly energized and at this time relays 401, 403, 404, 407, 412, 414, 415, 418, 419, 420, 524, 529, 540 and 612 are energized at the substation. Energization of relay 401 opens the locking circuit for the relay 407 and this relay is de-energized. A further result of the energization of relays 401 and 403 is to complete a circuit for the close control relay 509 at the substation over a circuit from positive battery, back contact and armature 413—a, armature 405—c and its back contact, armature 401—b and its front contact, armature 402—b and its back contact, armature 403—a and its front contact, armature 420—b and its front contact, and through the winding of relay 509 to negative battery. Relay 509, upon energization, completes a circuit for the closing relay 642 of the breaker, associated with point selection relay 612 from positive battery, armature 460—b and its back contact, armature 509—c and its front contact, armature 612—b and its front contact, through the closing relay 642 of the breaker to negative battery. The closing relay operates the breaker over conductors 662 to its closed position.

At the office, energization of the relay 105 which started the transmission of the closing code, also energized the relay 106 which in turn opens the energizing circuit for the relay 105. Relay 105 de-energizes after an interval of time, terminating the transmission of the closing code. Circuits are now in condition for the transmission of a closed supervisory code to indicate to the dispatcher that the circuit breaker has been closed in accordance with the close code transmitted from the office. The operation of the breaker to its closed position energizes the relay 632 which is controlled over the contacts of the auxiliary switch 682. As a result of the energization of the relay 632 the relay 622 is de-energized, due to the momentary opening of its locking circuit, at the contacts 632—a, and the circuit for the relay 524 is also opened, while a new circuit is completed over the front contact 632—b of relay 632, instead of the back contact 632—b as traced above, and relay 523 energizes preparatory to the transmission of a new supervisory signal indicating a closed condition of the breaker.

After an interval of time the closing code transmitted from the office is terminated by the release of relay 105 thereat, causing relays 401 and 403 at the substation to de-energize.

As a result of the de-energization of relays 401 and 403 the circuit for relay 509 is opened and this relay de-energizes. A circuit is also completed for the relay 405, as traced before, completing a circuit for relay 406 which in turn operates relay 407 over the circuits already traced.

The energization of relay 523 at the substation prepares a supervisory code to be transmitted over a circuit which is completed upon the energization of relay 405 and which controls the transmission of a pulsating current of a polarity opposite to that controlled by relay 524. The pulsating current transmitted over this circuit is in such a direction that it can only flow in the circuit of the relay 101 at the office. Being of a pulsating character, this current also flows through the condenser 165, over rectifiers 166 and 167 through the winding of the relay 103, in parallel with relay 101. Accordingly, relays 101 and 103 at the office are energized.

Energization of relays 101 and 103 completes a circuit for the closed supervisory relay 209 from positive battery over back contact and armature 113—a, armature 105—c and its back contact, armature 101—b and its front contact, armature 102—b and its back contact, armature 103—a and its front contact, armature 120—b and its front contact and through the winding of relay 209 to negative battery.

Relay 209, upon energization, completes a circuit for relay 322 from positive battery through the winding of relay 322, front contact and armature 312—b, armature 209—b and its front contact and through a resistor to negative battery.

Relay 322, upon energization, completes a locking circuit for itself over armature 322—b and its front contact, and at its armature 322—c opens the circuit for the green lamp 305 and closes a circuit for the red lamp 303 indicating at the office that the circuit breaker has been closed. Relay 322 also opens the circuit of the disagreement lamp 301, which accordingly is extinguished.

Energization of the relay 209 also completes a circuit over contact 209—a for relay 210 which is in multiple with the circuit for relay 223. Relay 210 upon energization opens the circuit for the relay 223 to stop the transmission of a further closing code and thereby to prevent pumping of the breaker.

In supervisory control systems the remote circuit breaker may be closed upon a short circuit and will then attempt to trip immediately. The dispatcher, however, may be unaware of this condition and unless provision is made for automatically opening the closing circuit upon receipt of supervisory signal indicating the closing of the breaker, the breaker may be held in a closed position against a short circuit.

In the present system this is prevented by the energization of relay 210 which, as described above, opens the energizing circuit of relay 223. At the same time a circuit is completed for the relay 221 over the front contact of the armature 210—b, thus substituting the holding code for the closing code even before the dispatcher releases the master control key 201.

At the substation, upon energization of relay 405 for the transmission of the closed supervisory code, relay 406 was energized which in turn energized relay 407 and a circuit was thereby completed for the point start relay 622. This circuit extends from positive battery over armature 407—c and its front contact, armature 612—b and its front contact, front contact and armature 632—a, and through the winding of relay 622 to negative battery. Relay 622 closes an obvious locking circuit for itself.

The operations described above for the transmission of a holding pulse from the office as a result of the energizing of relay 221 and the transmission of a closed supervisory code as a result of the closed condition of the breaker are now continued indefinitely until another operation occurs at the office or a change in the breaker condition occurs at the substation.

Following the receipt of the supervisory signal from the substation, indicating that the breaker has been closed, the dispatcher will release his master control key 201. Relay 207 at the office, however, will remain energized over a locking circuit extending over the armature 103—c and its back contact, and front contact and armature 207—c to positive battery over front contact and armature 104—b. This locking circuit for relay 207 is maintained until the next supervisory code is received to prevent mutilation of impulses in the event that the master control key is released while a code is being transmitted from the office. When the next supervisory code is received relay 103 at the office is energized, opening the locking circuit for relay 207. Relay 210 remains locked until the control key 304 is turned to the trip position or until the selection is released.

When the dispatcher releases the selection by the restoration of the point key 306, relay 111 releases to prevent the sending of further holding pulses after the next supervisory pulse from the substation is received. The transmission of pulses therefore stops and relays 104 and 404 at both ends release, in turn releasing all other energized relays and re-operating relays 227 and 527 at both ends. At the substation relay 412 releases after a predetermined delay maintaining the circuit of the substation start relay 411 open for a short interval. This gives the dispatcher at the office preference over supervisory signals and enables him to break in for any control operations he may desire, even though the substation may not have transmitted all of the supervisory signals for changes which have occurred.

In the foregoing a closing operation of the breaker has been described in detail. For tripping operation selections are made in exactly the same manner, except that a trip code is transmitted instead of a closing code. This is accomplished by the energization of relay 224 instead of relay 223 over back contact 304—b of control key 304. Relays 402 and 403 at the substation are operated in response to this code to energize relay 508 instead of the operation of relays 401 and 403 to energize relay 509 as in the case of the close code. Similarly, relays 102 and 103 at the office are operated to operate in turn relay 208 instead of relays 101 and 103 operating relay 209. Relay 210 at the office in that case will not operate. Relay 208 causes the release of the supervisory lamp relay 322 by short-circuiting its winding as described before. The release of relay 322 extinguishes the red supervisory lamp 303 and lights the green supervisory lamp 305 to indicate that the breaker is tripped.

The selecting and checking operations for other points are the same as those described hereinbefore for one particular point, except that other codes are substituted for the group and point selecting and checking impulses. In the operations described above, code #1 is used for group selection and group check, and code #2 for point selection and point check. The second point shown on the drawings is selected by sending code #1 for group selection and code #3 for point selection. The third point uses code #1 for group and code #4 for point selection, and so forth. It will be evident that any one of the five possible codes may be used for group selection as well as for unit or point selection, so that 25 different combinations are possible with two selecting impulses. If a third selecting impulse were used, the number of possible combinations would increase to 125, and so forth.

In the foregoing a complete description has been given of all the operations which occur when a dispatcher at a control office selects, operates and supervises a remote circuit breaker located at a substation. The operations which occur, when a breaker automatically operates, to give an indication to the dispatcher of such operation, will now be described in detail except that where the circuits are the same they will not be given again in detail.

It will be assumed for purposes of illustration that the breaker associated with selection relay 612 has tripped from its closed position. At this time the normal circuit conditions as described under control operations are the same; namely—relay 227 in the office and relay 527, as well as the point start relays 622, 624, etc., in the substation are energized. The relay 632 is also energized at this time because of the circuit breaker being closed. Upon the tripping of the circuit breaker the circuit for relay 632 is opened at the contacts of the auxiliary switch 632 of the breaker and relay 632 de-energizes, in turn opening the locking circuit for relay 622 during the interval while the armature 632—a of relay 632 moves from its front to its back contact. Relay 622, upon de-energization, opens its own locking circuit at front contact and armature 622—c which prevents this relay from energizing again when relay 632 closes its back contact 632—a. A circuit is thereupon completed for the start relay 411 and the sending code control relay 521 in series from positive battery through armature 404—b and its back contact of relay 404, armature 412—b and back contact, through the winding of relay 411, through armature 407—a and its back contact, break contact of armature 415—a, break contact of armature 414—a, armature 622—a and its back contact, and through the winding of relay 521 to negative battery. Relay 411 closes a new circuit for itself over front contact and armature 411—a, so that the subsequent operation of relays 404 and 412 will not open its circuit.

The circuit for pole-changer 540 is also closed over the armature 622—c and its back contact to generate the necessary alternating current for the transmission of code signals. A circuit is now completed for relay 405 from positive battery through armature 402—a and its back contact of relay 402, armature 401—a and its back contact, break contact of armature 407—b, armature 411—b and its front contact, back contact and armature 415—b, armature 406—b and its back contact, and through the winding of relay 405 to negative battery. The energization of relay 405 completes the circuit for transmitting the code signal determined by the previous energization of relay 521.

As has already been described, energization of relay 521 applies negative battery to the conductor L—2 and positive battery to the conductor L—1 so that an impulse of a predetermined character is now transmitted over the conductors L—1 and L—2 to the office. This impulse is, of course, in accordance with the group in which the breaker is located. A further result of the energization of relays 521 and 405 is to close a circuit for the relay 529 from positive battery over back contact and armature 413—a, armature 405—c and its front contact, armature 419—c and its back contact, armature 521—c and its front contact, armature 527—a and its front contact, and through the winding of relay 529 to negative battery. Relay 529 is the group selection relay for group #1. As will be described hereinafter, when a check code is received back from the office, indicating the selection made thereat, it must agree with the group selection made at the substation as indicated by the energized group selection relay 529 before the actual supervisory code for indicating the condition of the breaker can be transmitted to the office. A further result of the energization of relay 405 is to complete a circuit for relay 406 which, in turn, opens the circuit of relay 405, but relay 405 is a slow-to-deenergize relay and will not drop out until the operations to be performed at the office are completed. Energization of relay 406 also completes a circuit for the holding relay 404 which with its armature 404—b functions to hold the selections made during the subsequent operations. Start delay relay 412 operates in multiple with relay 404 as described above.

At the office, in response to the particular polarity of the impulse transmitted over the conductors L—1 and L—2, relay 101 is energized. This is due to the arrangement of the rectifiers 163 which permit current to flow only in a predetermined direction in the circuit of relay 101, this direction being in conformity with the polarity of the impulse transmitted over L—1 and L—2 in the present case. In response to the energization of relay 101 at the office, a circuit is completed for the group selection relay 229 at the office, from positive battery through back contact and armature 413—a, armature 105—c and its back contact, armature 101—b and its front contact, armature 102—b and its back contact, armature 103—a and its back contact, armature 227—a and its front contact, and through the winding of relay 229 to negative battery.

It will be noted that the circuit now established is different from the circuit traced when operations originated at the office, insofar as the circuit for relay 229 is completed over the armature of relay 101 in response to a code received from the substation, instead of being closed over the armature of relay 221 which is the corresponding sending code control relay energized in response to a code originated at the office.

As a further result of the energization of relay 101, a circuit is completed for relay 104 from positive battery over the armature 102—a and its back contact, armature 101—a and its front contact, and through the winding of relay 104 to negative battery. Relay 104, as in the previous case, functions to hold the selection relays operated during the remaining selecting operations thereby performed, and also to open the circuit of start relay 111, so that no operations can be originated from the office, until the supervisory operation originated at the substation is completed. A circuit is also completed for the pole-changer 240 over front contact and armature 104—a of relay 104, to keep the pole-changer 240 in operation until the supervisory operation is completed.

At this time, therefore, relays 101, 104, 227, 229 and 322 are energized in the office, the latter relay being energized to indicate the closed condition of the breaker prior to the receipt of the trip supervisory signal now being transmitted.

At the substation, in response to the energization of the relay 406, the circuit for relay 405 was opened and this slow relay now de-energizes. A circuit is thereupon completed for relay 414 in series with relay 529. Heretofore this series circuit was not effective because of the fact that the energized relay 405 provided a by-pass around the winding of relay 414. Relay 414 is provided with a make-before-break contact 414—a and upon the energization of this relay the circuit for relay 521 is opened while a new circuit is completed for the relays 411 and 522 in series from positive battery over armature 404—b and its front contact, armature 411—a and its front contact, through the winding of relay 411, armature 407—a and its back contact, break contact of armature 415—a, armature and front contact 414—a, armature 529—g and its front contact, armature 622—b and its back contact, and through the winding of relay 522 to negative battery. As a further result of the energization of relay 414 the circuit for the group relay 527 is opened and this relay de-energizes. A circuit is in turn completed for the relay 528 as traced hereinbefore. Relay 528 prepares the substation for the selection of one of the points in the selected group. At this time relays 406, 411, 414, 522, 528, 529 and 540 are energized at the substation.

At the office, following de-energization of relay 405 at the substation and the termination of the group selection impulse, relay 101 de-energizes and a circuit is completed for relay 114 in series with relay 229. As in the case of the substation, relay 114 was heretofore by-passed by the energized relay 101 and upon de-energization of relay 101 this by-pass is removed, permitting energization of relay 114. Relay 227 is de-energized upon the energization of relay 114 and in place thereof a circuit is completed for relay 228 over the front contact and armature 414—b. Relay 228 is the point control relay at the office.

At the substation, following the de-energization of relay 406 as a result of the de-energization of relay 405, the circuit for relay 405 is again completed and this relay energizes. Relays 405, 411, 412, 414, 522, 528, 529 and 540 are then energized at the substation. Energization of relay 405 completes a circuit for relay 612 which is the point selection relay associated with the tripped breaker. This circuit extends from positive battery, back contact and armature 413—a, armature 405—c and its front contact, armature 419—c and its back contact, armature 521—c and its back contact, armature 522—c and its front contact, armature 528—b and its front contact, armature 529—c and its front contact, and through the winding of relay 612 to negative battery. A further result of the energization of relay 405 is to complete a circuit for relay 406 which in turn opens the energizing circuit of the slow relay 405.

A further result of the energization of relay 405 is to complete the transmission of a code impulse for the point selection in accordance with the energized relay 522 which impresses positive battery on the conductor L—2 and negative battery on the conductor L—1.

At the office, in response to this impulse, current can flow only in the circuit of the relay 102 which accordingly is energized and in turn completes a circuit for the point selection relay 312 at the office, from positive battery over the back contact and armature 113—a, armature 105—c and its back contact, armature 101—b and its back contact, armature 102—c and its front contact, armature 103—b and its back contact, armature 228—b and its front contact, armature 229—c and its front contact, and through the winding of relay 312 to negative battery. The relay 312 energizes to indicate the point selection received from the substation.

At the substation, relay 405 is de-energized after an interval of time following the completion of the above described operations at the office. A circuit is thereby completed for relay 415 in series with the relay 612, as described hereinbefore. Energization of relay 415 opens the circuit for relay 522 which drops out at this time, while the circuit for relay 411 is maintained over armature 415—a and its front contact to negative battery through a resistor. As a further result of the energization of relay 415, a circuit is completed for relay 413 from positive battery over armature 420—a and its back contact, armature 415—a and its front contact, armature 411—c and its front contact, and through the winding of relay 413 to negative battery. The relay 406 at the substation also de-energizes now as a result of the de-energization of relay 405.

At the office, in response to the de-energization of the relay 405 at the substation, the relay 102 is de-energized. A circuit is thereupon completed for relay 115 in series with relay 312, this circuit having been previously by-passed by the energized relay 102. Energization of the relay 115 completes a circuit for relay 226 which in turn completes a circuit over its armature 226—f for relay 113. A circuit is thereby completed for relay 222 in series with relay 115 over armatures and front contacts 226—b, 228—b, 229—c and 312—a. At this time relays 104, 113, 114, 115, 222, 226, 228, 229, 240, 312 and 322 are energized at the office. Of these relays 229 and 312 were energized in accordance with the group and point selection codes received from the substation, and relay 222 is now energized under control of the point selection relay 312 to transmit back to the substation a check code indicating the point selection made at the office.

Relay 222 upon energizing, prepares a circuit for the transmission of the check code back to the substation and the check code circuits are completed upon the energization of relay 105 which is energized over a circuit from positive battery, armature 102—a and its back contact, armature 101—a and its back contact, armature 111—c and its back contact, armature 112—b and its back contact, front contact and armature 113—b, armature 106—b and its back contact, and through the winding of relay 105 to negative battery. Upon the energization of relay 105 an impulse of a predetermined polarity is transmitted to the substation, the energization of relay 222 impressing positive battery on the conductor L—2 and negative battery on the conductor L—1.

At the substation, in response to this impulse, the relay 402 is energized, the polarity being such that the current can only flow in the circuit of relay 402. Energization of the relay 402 completes a circuit for relay 416 in series with relay 415 from positive battery over armature 404—b and its front contact, through the winding of relay 415, front contact and armature 612—a, front contact and armature 529—c, front contact and armature 528—b, back contact and armature 403—b, front contact and armature 402—c, back contact and armature 401—b, back contact and armature 405—c, armature 413—a and its front contact, armature 417—b and its back contact, break contact of armature 416—b and through the winding of relay 416 to negative battery.

Relay 416 is provided with make-before-break contact and upon energization completes a locking circuit for itself over the armature 416—b and its front contact through a resistor, back contact and armature 419—a, to positive battery over front contact and armature 404—b. Relay 416 is the point checking relay which, upon energization, indicates that the correct selection has been made at the office. As should now be clear, this relay is energized only if the circuit prepared therefor by energization of relay 612 in response to the transmission of the point selection code, agrees with the checking code received from the office.

At the office, upon energization of relay 105, a circuit is completed for relay 116 in series with the relay 115 from positive battery through armature 104—b and its front contact, the winding of relay 115, front contact and armature 312—a, front contact and armature 229—c, front contact and armature 228—b, front contact and armature 222—c, back contact and armature 221—c, back contact and armature 119—c, front contact and armature 105—c, armature 113—a and its front contact, armature 117—b and its back contact, break contact of armature 116—b, and through the winding of relay 116 to negative battery. Relay 116, upon energization, completes a locking circuit for itself over its make-before-break armature 116—b, a resistor, the back contact and armature 119—a to positive battery over the front contact and armature 104—b.

A further result of the energization of relay 105 is to complete a circuit for relay 106 which in turn opens the circuit of relay 105 and relay 105, which is a slow to de-energize relay, will then de-energize after an interval of time.

Upon the de-energization of relay 105 the point check code being transmitted back to the substation is terminated. A further result of the de-energization of relay 105 is to complete a circuit for the check switching relay 117 as described hereinbefore. Relay 117 is provided with a make-before-break contact 117—a and upon energization completes a locking circuit for itself over this armature. Energization of the check switching relay 117 opens the circuit of the point control relay 228 which thereupon de-energizes and in place thereof a circuit is completed over front contact and armature 117—c for the group control relay 227. The code controlling relay 222 is de-energized as a result of the de-energization of relay 228 and a circuit is completed for the relay 221 instead, by the energization of relay 227 in series with relay 114 over front contacts and armatures 226—a, 227—a and 229—a. Relay 221 is the code sending relay which determines the particular character of the impulse to be transmitted over the conductors L—1 and L—2 in accordance with the group selection made at the office and this code will be transmitted upon the energizing of relay 105 at the office.

Meanwhile, following the de-energization of relay 105 at the office and the end of the point check code, relay 402 at the substation de-energizes. Relay 417 is thereupon energized and locks itself over its make-before-break contact, the point control relay 528 is de-energized and in its place the group control relay 527 energizes, all as described before, and the substation is now in condition to receive the group check code.

At the office, following the de-energization of relay 105 at the end of the point check code, relay 106 de-energizes and recloses circuit for relay 105. Relay 105 energizes and completes the circuit for the transmission of the group check code over the conductors L—1 and L—2. It will be recalled that relay 221 is energized and this relay impresses positive battery upon the conductor L—1 and negative battery upon the conductor L—2. At the substation, in response to an impulse of this particular polarity flowing over the conductors L—1 and L—2, the relay 401 only is energized by reason of the rectifiers 463. At this time relays 401, 411, 412, 413, 414, 415, 417, 527, 529, 540 and 612 are energized at the substation. Energizing of relay 401 completes a circuit for relay 418 in series with relay 414 from positive battery, armature 404—b and its front contact, winding of relay 414, front contacts and armatures 529—a and 527—a, back contact and armature 403—*a*, back contact and armature 402—*b*, front contact and armature 401—*b*, back contact and armature 405—*c*, armature 413—*a* and its front contact, armature 417—*b* and its front contact, break contact of armature 418—*b*, and through the winding of relay 418 to negative battery. Relay 418, upon energization, locks itself over its make-before-break armature 418—*b* to positive battery over front contact and armature 404—*b*.

At the office, energization of relay 105 completes a circuit for the group check relay 118 in series with the relay 114, similar to the circuit traced above for the corresponding relay at the substation, except that this circuit extends over armature 221—*c* and its front contact and armature 105—*c* and its front contact. As a result of the energization of relay 118 at the office a circuit is completed for the point lamp 302 as traced before. Energization of relay 105 at the office also energizes relay 106 which in turn opens the circuit of relay 105 and thereby terminates the group check code. Upon the deenergization of relay 105 at the office relays 119 and 120 are energized in series and locked as traced before. Energization of relay 120 opens the circuit for relays 113, 226 and 227. Energization of relay 119 opens the locking circuits for relays 116 and 117.

At the substation, following the termination of the group check impulse, the relay 401 deenergizes and a circuit is completed for relays 419 and 420 in series as traced hereinbefore. Energization of relay 420 opens the circuit for relays 413 and 527 and these two relays are thereupon released. Energization of relay 419 opens the locking circuit for relays 416 and 417 and these relays thereupon release. A circuit is then completed for relay 405 from positive battery, through armature 402—*a* and its back contact, armature 401—*a* and its back contact, break contact of armature 407—*b*, armature 419—*b* and its front contact, front contact and armature 415—*b*, armature 406—*b* and its back contact and through the winding of relay 405 to negative battery. In response to the energization of relay 420 a circuit is completed for relay 524 as traced before.

Energization of relay 524 now controls the transmission of the tripped supervisory impulse in accordance with the condition of the breaker, the selection of the proper point at the office having been completed and checked.

At the office, relay 106 is de-energized as a result of the de-energization of relay 105 and the office is conditioned for the receipt of the supervisory signal to indicate the condition of the circuit breaker.

At the substation, the energization of relay 405 completes a circuit for relay 406 which in turn completes a circuit for relay 407. Relay 407 operates to prevent the substation from transmitting any further impulses and opens the circuit of relay 411, which releases. Relay 622 is energized in response to the energization of relay 407 over a circuit already described before. Relay 622 energizes and locks itself. Energization of the relay 405 also completes the circuit for transmitting the supervisory code under control of the energized relay 524. Relay 524 controls the transmission of a pulsating impulse impressed upon the conductors L—1 and L—2. The direction of this pulsating impulse is such that relay 102 at the office is energized. Inasmuch as this impulse is of a pulsating character, it will also pass through the condenser 165 and over the rectifiers 166 and 167 through the winding of relay 103. Relays 102 and 103 are accordingly energized and in turn complete a circuit for the trip supervisory relay 208 over the circuit heretofore described. In response to the energization of relay 208 a circuit by-passing the winding of relay 322 is completed from positive battery, armature 208—*b* and its front contact, back contact and armature 209—*b*, armature 312—*b* and its front contact to relay 322 which is accordingly de-energized, opening the circuit for the red lamp 303 at the front contact 322—*c* and closing a circuit for the green lamp 305 at the back contact 322—*c*.

The circuit for the disagreement lamp 301 is also closed at this time over the armature and back contact 322—*a* and front contact 304—*a* of key 304, which is in the closed position, over winding of relay 235 to negative battery, causing relays 235 and 236 to operate intermittently for flashing lamp 301 as described before. A circuit is also completed for the alarm relay 234 from positive battery over armature 104—*b* and its front contact, armature 112—*a* and its back contact, armature 208—*a* and its front contact and through the winding of relay 234. Relay 234 locks over an obvious circuit and remains locked until the dispatcher operates the release key 202. Energization of relay 234 closes a circuit for the alarm bell 204 and alarm lamp 203.

At the substation, energization of the relay 406 opens the circuit for relay 405 and this relay will be de-energized after an interval of time, in turn opening the circuit for relay 406. Relay 406 in turn, upon de-energization, opens the circuit for relay 404. Impulses are no longer sent or received, so that slow relay 404 de-energizes after an interval of time. The de-energization of relay 404 opens the circuits for relays 414, 415, 418, 419, 420, 529, 540, and 612. As a result thereof relays 407 and 524 are also de-energized, leaving relays 622 and 527 energized at the substation.

At the office, following the de-energization of substation relay 405 to terminate the transmission of the supervisory signal, relays 102 and 103 de-energize, in turn de-energizing relay 208. No further impulses are sent or received so that relay 104 is de-energized after an interval of time, which in turn de-energizes relays 114, 118, 119, 120, 229, 240 and 312. Relay 221 in turn de-energizes, leaving relay 227 energized at the office and the system is restored to normal. The supervisory indication has thus been given of the automatic operation at the substation.

In the event that either or both of the group and unit check codes which are transmitted back to the substation from the office do not correspond to the apparatus unit which has automatically operated, the substation will continue to automatically retransmit the group and unit selection codes until the selection is checked and the supervisory code transmitted as described in detail hereinbefore.

When an apparatus unit at the substation operates automatically, group and unit selection codes are transmitted to the office and group and unit selections are made thereat. Group and unit selections are also made at the substation corresponding to the unit which has operated. The office then transmits group and unit check codes back to the substation and if these codes correspond to the local group and unit selections made thereat, a circuit is completed for relays 419 and 420 as described hereinbefore. The energization of relay 420 opens the circuit for relays 413 and 527 and completes a circuit for relay 524. The energization of relay 419 opens the circuit for relays 416 and 417 and completes the circuit for relay 405. Since the code control relay 524 and the sending relay 405 are both closed, a tripped supervisory impulse is transmitted.

In the event, however, that the check code or codes do not agree with the local selection at the substation, the relays 419 and 420 are not closed and the circuits for operating relays 524 and 405 are not completed. The selection made at the office is maintained for a predetermined time by the holding relay 104, however, if the supervisory code is not received from the substation within the predetermined time the holding relay drops out and the apparatus at the office restores to normal and is ready to receive another selection from the substation. Likewise at the substation if the supervisory code is not transmitted to the office and the holding code received therefrom before the holding relay 404 drops out, the apparatus is also restored to normal and since the apparatus unit is still open, the apparatus is again initiated into operation to repeat the sending of the group and unit selection codes, which will be continued in the foregoing described manner until the selection is properly checked and the supervisory code transmitted.

My system is arranged not only for the transmission of control and supervisory signals but also for remote metering and synchronizing. The point associated with point selection relays 321 and 621 illustrates metering over the system. The selection of this point is made by operating key 356 in the same manner as that described in detail above for the remote control and supervision of a breaker, except that the group and point selection codes are different. The point selection relays 321 and 621 are energized in response to such selection codes. The office then transmits the holding code in the manner already described in detail, alternating with a trip supervision code transmitted from the substation. When the master control key is pressed, the office transmits a closing code in place of the holding code. At the substation this closing code, instead of closing a breaker, functions to energize relay 449. Relay 449 changes the supervisory code from trip to close by de-energizing the relay 524 and energizing the relay 523. The close code received at the office operates the relay 149 thereat, which locks up and prevents further sending from the office.

This cessation of further impulses releases relays 104 and 404 at both ends, but the selections in this case are held in at the office by relays 111 and 112 and at the substation by relay 449. The release of relays 104 and 404 closes circuits for relays 150 and 450 at both ends. At the office, relay 150 energizes relay 160, disconnects the line receiving relays 101, 102 and 103 and connects the selected metering receiver 351 to the line. At the substation, relay 450 disconnects the line relays 401 and 402, but leaves line relay 403 across the line through the condenser 465. Relay 450 also connects the selected metering transmitter 655 to the line and energizes relay 460. The system remains in this condition and direct current metering indications are transmitted over the line, but will not pass through relay 403 on account of the condenser 465.

When the dispatcher wishes to release the metering set-up he restores the point selection key 356, thereby de-energizing relay 111. This drops the selection, closes a circuit for relay 159, which in turn de-energizes slow relay 150, unlocks fast relay 149, operates relay 225 and connects the line to the code transmitting relays. As a result, an impulse of alternating current is transmitted to the substation until slow relay 150 drops out. Relay 159 also operates relay 104 for the purpose of starting the pole changer. Relays 159 and 160 release subsequently, restoring the office to normal.

At the substation the alternating current impulse operates relay 403 which unlocks relay 449, while holding relay 450 energized. The release of relay 449 disconnects the metering transmitter. When the alternating current impulse is terminated, relays 403 and 450 release, in turn releasing relay 460 which opens the holding circuit for the selection and permits the substation to return to normal.

It will be readily understood that any of the well known forms of metering transmitters and receivers may be used such, for example, as those disclosed by the United States patent to P. MacGahan No. 1,258,030, of March 5, 1918, and the United States patents to B. E. Lenehan Nos. 1,813,177, of July 7, 1931, and 1,953,114, of April 3, 1934. The type of receiver or transmitter is immaterial, since they are connected directly to the signalling channel which functions only as a connecting circuit.

For the purpose of raising and lowering the voltage of the power system, while simultaneously receiving meter indications of such voltage changes or for similar operations, I have shown the point associated with point selection relays 323 and 623. For raising the voltage, circuit operations exactly like those described for metering are employed, except that when the metering transmitter is connected to the line at the substation a local circuit is also closed for the raising relay 646. For lowering, the functions are similar except that the trip code is transmitted from the office instead of the close code. This energizes relay 559 at the substation instead of relay 449. Relay 559 in turn energizes relay 449 and also switches the local circuit from the raising relay 646 to the lowering relay 656.

Synchronizing is illustrated by the point associated with point selection relays 313 and 613. Circuits similar to those described for metering are used. When the dispatcher wishes to release without closing the breaker, he merely restores the point selection key which releases the set-up just as in metering. When he wishes to close the breaker he presses the master control key and holds it down while restoring the point selection key. In this case an alternating current impulse is transmitted as in metering until relay 159 de-energizes. Relay 150 upon de-energization, in turn de-energizes relay 160 which opens the circuit for relay 159. Relay 160 de-energizes after an interval of time. A circuit is now closed for relay 223 over the master control key so that the close control code is transmitted, following the alternating current release impulse, until relay 159 de-energizes. At the substation this close code operates the breaker whereupon the circuit restores and proceeds to transmit a supervisory signal indicating the changed position of the breaker.

In the following circuit operations for metering, raising, lowering and synchronizing will be described in more detail. As already stated, the selection made for the metering point associated with relays 321 and 621, is exactly the same as that described in connection with supervision and control, except, of course, that the point relays 321 at the office and 621 at the substation are energized by the transmission of proper selecting codes.

The master control key 201 is operated just as described for control and supervisory operations, causing the close code to be sent to the substation, where relay 509 is energized thereby. Relay 509 in turn energizes relay 449 over a circuit from positive battery, armature 460—b and its back contact, armature 509—c and its front contact, armature 621—d and its front contact, and through relay 449 to negative battery. Relay 449 locks over armature 449—d and its front contact, resistor 468 and back contact and armature 460—a to positive battery. Relay 449 also de-energizes relay 524 and energizes relay 523 over a circuit from positive battery, armature 420—a and its front contact, armature 413—c and its back contact, armature 621—c and its front contact, armature 449—e and its front contact, and through relay 523 to negative battery. Relay 449 furthermore places positive battery over front contact 449—a on the holding circuit of the energized selection relays to maintain the selection when subsequently relay 404 releases.

After the close impulse from the office is terminated, the substation sends a close supervisory code back to the office, because of relay 523 being energized in place of relay 524. This close supervisory code is received at the office, causing the energization of relay 209, as described before. Relay 209 closes a circuit for relay 149 from positive battery through armature 159—b and its back contact, winding of relay 149, front contact and armature 321—b, armature 209—b and its front contact to negative battery through a resistor. Relay 149 locks over its front contact and armature 149—c to negative battery and opens the circuit of relay 105 at its back contact 149—a, thereby preventing the transmission of further impulses from the office.

The cessation of impulses causes the release of relay 104 at the office and of relay 404 at the substation. At the office the selection relays are maintained energized over front contacts 111—a and 112—a. The release of relay 104 closes a circuit for relay 150 from positive battery through armature 104—b and its back contact, armature 149—a and its front contact, through the winding of relay 150 to negative battery. Relay 150 energizes relay 160 and also, at its back contact 150—a disconnects the line relays 101, 102 and 103 from conductor L—2 and connects this conductor to the metering receiver 351 over front contact 150—b and front contact 321—e. The other side of the metering receiver is permanently connected to conductor L—1. The result of these operations at the office is that the metering receiver 351 is connected across the conductors L—1 and L—2, while all other circuit bridges between these conductors are removed.

At the substation, the release of relay 404, due to the cessation of impulses from the office, closes a circuit for relay 450 in multiple with the resistor 468 in the holding circuit of relay 449. This circuit in detail extends from positive battery through armature 404—a and its back contact, the winding of relay 450, break contact of armature 403—c, front contact and armature 449—d, the winding of relay 449 to negative battery. Relay 450 at its back contact 450—a disconnects the line relays 401 and 402 from conductor L—2 and connects this conductor to the metering transmitter 655 over a contact of relay 645 which is also energized by relay 450 over a circuit from positive battery through armature 450—b and its front contact, front contact and armature 449—c, armature 559—b and its back contact, armature 621—b and its front contact, winding of relay 645 to negative battery. Relay 450 also closes a circuit for relay 460 over armature and front contact 450—b. The result of these operations at the substation is that the metering transmitter is conneced across the line conductors L—1 and L—2, while all other circuit bridges across these conductors are removed, with the exception of the line relay 403, which, being connected to the conductors through a condenser 465, does not affect in any way the transmission of direct current metering indications.

The system remains in this condition with the metering receiver connected to the line at the office and the metering transmitter connected to the line at the substation end. The dispatcher notes the meter reading and can maintain this condition as long as desired. To release, the point selection key 356 is restored to normal, whereby relay 111 is de-energized, in turn de-energizing all energized relays at the office, except relays 149, 150 and 160. The release of relay 111 closes a circuit for relay 159 extending from positive battery over armature 111—a and its back contact, armature 160—a and its front contact, and through the winding of relay 159 to negative battery. Relay 159 is the metering release relay and disconnects the metering receiver at back contact 159—a. The office is otherwise back in normal condition and a circuit is completed for the relay 227 as described before. A circuit is also completed for the relay 104 over the armature 159—a and its front contact to keep the pole-changer 240 in operation.

A further result of the energization of the relay 159 is to de-energize relay 149 at the back contact 159—b. Relay 149 in turn opens the circuit of relay 150, but this relay is of the slow releasing type and remains energized for a while. Relay 225 now energizes over a circuit from positive battery, armature 159—c and its front contact, armature 150—c and its front contact, armature 160—b and its front contact and through the winding of relay 225 to negative battery. Relay 225 is one of the sending code control relays and transmits a release pulse which consists of alternating current generated at the transformer 206 impressed upon the line from the secondary of the transformer over front contact and armature 225—b, back contacts and armatures 224—b, 223—b, 222—b and 221—b, front contact and armature 159—a, back contact and armature 105—a to the line L—2. The other side of the transformer extends over front contact and armature 225—a, back contacts and armatures 224—a, 223—a, 222—a and 221—a to the conductor L—1. It will be noted that this circuit extends around the front contact and armature 105—a of relay 105 and is accordingly independent of the energization of this relay.

At the substation this alternating current functions to energize relay 403. Energization of the relay 403, at back contact 403—c, opens the circuit for relay 449 which is thereupon de-energized. The metering transmitter 655 is accordingly disconnected at front contact 449—b, and relay 645 is de-energized at front contact 449—c. Relay 450 is held energized by relay 403 over a circuit from positive battery, back contact 404—a, winding 450, front contact 403—c, front contact 450—c to negative battery through a resistor. After the release of relay 449, the selection relays are held over front contact 460—a.

At the office, relay 150 will now release and open the circuit for relay 225 which is also de-energized. This ends the release pulse and relay 403 at the substation de-energizes, in turn de-energizing the relay 450. Relay 450 opens the circuit of the relay 460 which in turn de-energizes all other relays energized at this time, and re-operates relay 527, thereby restoring the apparatus at the substation to normal. The point start relays, such as 622, 624, etc., and the point supervisory relays, such as 632, 634, etc., of closed breakers, are not affected by the release of the substation apparatus and, therefore, remain energized.

At the office, upon de-energization of the relay 150, relay 160 is de-energized, which in turn de-energizes the relay 159. Relays 104, and 240 are then de-energized and relay 227 remains energized, the apparatus being therefore in its normal condition.

For voltage regulation, the selection point associated with relays 323 and 623 is used. Operations similar to those described for metering take place, except that to raise the voltage, raise relay 646 is energized instead of metering relay 645. Relay 646 controls the local operations necessary for raising the voltage over conductors 666 and also energizes metering relay 645 to connect the associated metering transmitter to the line. To lower the voltage the control key 364 is turned to the position shown in the drawing, which energizes relay 224 instead of 223. As a result, relays 402, 403 and 408 operate at the substation in place of the relays 401, 403 and 409. This operates relay 559 in place of relay 449. Relay 559 in turn energizes relay 449 and also switches the local control circuit from relay 646 to relay 656, which controls the local operations necessary for lowering the voltage over conductors 676, and also energizes the metering relay 645.

For synchronizing, the selection point associated with relays 313 and 613 is used and operations are again similar to those described for metering, when the dispatcher releases without closing the breaker. If he wishes to close the breaker he presses the master control key 201 and holds it down while he restores the point selection key 336 at the proper time to close the breaker in synchronism, as indicated by the synchronoscope 331. The operations are again the same as those described for metering, up to the point where the relay 160 drops.

In the present case, i. e., with key 201 pressed, a new circuit is closed by the release of relay 160 for relay 223 which causes a close code to be transmitted following the alternating current release pulse, until slow relay 159 releases some time after the release of relay 160. This circuit for relay 223 extends from positive battery through front contacts 159—c, back contacts 150—c and 160—c, contact 201—a of key 201, winding of relay 223 to negative battery. This close code transmitted from the office to the substation operates relays 401 and 403, relay 450 having released after the termination of the alternating current release impulse. A circuit is thereby completed for the relay 509 and the corresponding circuit breaker is closed, over a circuit from positive battery, through front contacts 509—a and 613—b, winding of close relay 644 to negative battery. Close relay 644 in turn closes the breaker over conductors 664. Relay 460 is held energized during the closing impulse over front contacts 509—b and 460—b. The breaker, in closing, operates relay 634 and relay 624 is thereby de-energized.

At the office, slow relay 159 de-energizes after an interval, in turn de-energizing relay 223 and terminating the transmission of the close pulse. Relays 104 and 240 are now de-energized at the office, and this restores the office to normal. At the substation, the termination of the close pulse de-energizes relays 401 and 403, relay 509 is thereby also de-energized and relay 460 releases after an interval, removing positive battery over front contact 460—a from the selection relays. Thereupon the apparatus restores to normal in the manner which has already been described in detail and thereafter proceeds to send a supervisory indication to the office, originated by relay 624 being de-energized, for the purpose of controlling the supervisory lamps 343 and 345. This supervisory indication is similar to that described above for a breaker tripping automatically.

Although I have disclosed only a few selection points in illustrating my invention, it will be obvious that the number of selection points can be increased in the present illustration to 25 such points, viz. 5 groups of 5 points each, which constitutes the maximum number of distinct code selections possible by means of two selecting impulses in the form illustrated.

It will also be obvious that I can further increase the number of selection points by increasing the number of possible code combinations. Thus for example, I may double the number of different selection codes by using high and low voltages and providing relays responsive thereto in the line relay circuits. I may further increase the number of selections by using more than two selecting impulses, for example three selecting impulses will make 125 selections available. By increasing the number of lines, still further increases in the number of selections may be effected.

Although I have illustrated my invention for the operation and control of circuit breakers remotely disposed from dispatching point, it will be obvious that the principle of my invention may be applied to any form of selection and I do not intend to limit myself insofar as set forth in the appended claims.

I claim as my invention:

1. In a supervisory control system, a first station, a second station, a single signalling circuit connecting said stations, a meter at the first station, a metering transmitter and raise-lower control apparatus at the second station, means including the signalling circuit for selecting the metering transmitter and the raise-lower control apparatus from the first station and for connecting the meter thereat to the signalling circuit, means including said signalling circuit operable to connect and energize the raise control apparatus and to simultaneously connect the metering transmitter to the signalling circuit, and means including said signalling circuit for disconnecting the raise control apparatus and metering transmitter and for connecting and energizing the lower control apparatus and for simultaneously connecting the metering transmitter to the signalling circuit.

2. In a signalling system, a first station, a second station, a plurality of selection positions at each station, a signalling channel connecting said stations, a transmitter of single impulse signals of direct and pulsating currents of both polarities and alternating current at each station, a receiver of said single impulse signals at each station for selecting any one of said selection positions thereat, means at said first station including the transmitter thereat and the signalling channel for selectively operating the receiver at the second station, to select a selection position at the second station, means responsive to the operation of the transmitter at the first station for simultaneously selecting a selection position thereat, means at the second station responsive to the selection thereat including the transmitter and signalling channel for selectively operating the receiver at the first station to select a selection position, and means operable dependent upon the selections at the first station being the same for rendering said transmitter thereat operable to transmit an operating impulse.

3. In a signalling system, a first station, a second station, apparatus units at the second station, a single signalling circuit connecting said stations, a plurality of selection check signals at the first station, transmitter means at each station selectively operable to transmit single impulse signals over the signalling channel, said signals being comprised of steady and pulsating currents of both polarities and alternating currents, a receiver at each station selectively responsive to said single impulse signals, selector means at each station responsive to the operation of the receiver thereat or to the operation of the transmitter thereat, control means at the first station individual to the apparatus units at the second station for selectively operating said transmitter means thereat to effect the operation of the receiver at the second station whereby the selector means at the second station is operated to select an apparatus unit and the selector means at the first station is operated to make a local selection to select and condition one of said check signals thereat for operation, means at the second station responsive to the operation of the selector means thereat in accordance with the selected apparatus unit for selectively operating the transmitter means thereat to transmit a check signal whereby the receiver at the first station is caused to operate the selected check signal corresponding to the selected apparatus unit in the event that the selection at the second station corresponds to the local selection.

4. In a signalling system, in combination, a first station, a second station, a single signalling channel connecting said stations, a plurality of selecting relays at each station, a receiver at each station normally connected to the signalling channel selectively responsive to single impulse signals of steady and pulsating currents of both polarities and alternating current for selectively operating the selecting relays thereat in accordance with the character of the impulse signal received, a transmitter at each station normally disconnected from the signalling channel and selectively operable to produce signals of steady and pulsating currents of both polarities and alternating currents, and control means at each station for selectively operating the transmitter thereat to produce any one of said signals and for connecting the receiver to the signalling channel and disconnecting the receiver therefrom to cause the receiver at the other station to operate a selecting relay thereat in accordance with the character of the signal transmitted, means at each station whereby the operation of the transmitter thereat effects the operation of a selecting relay thereat corresponding to the character of the signal transmitted to make a local selection, means at each station responsive to the operation of a selecting relay thereat in response to an impulse signal received from the other station for initiating the operation of the control means thereat to cause the receiver to be disconnected from the signalling channel and the transmitter to be connected thereto to transmit a check signal to the other station, and means at each station responsive to the operation of the receiver thereat in response to a check signal for comparing the check signal with the local selection thereat.

5. In a signalling system, a first station; a second station; selecting apparatus at each station comprising group and unit selecting mechanism; means at each station for transmitting a group selection impulse to the other station, means at said other station responsive to said impulse for operating the selecting apparatus thereat to make a group selection; means for terminating said impulse; means at each station responsive to the operation of the transmitting means thereat to operate the selecting mechanism thereat to make a local group selection; and means responsive to the termination of said impulse for rendering said group selecting mechanism non-responsive to an impulse and said unit selecting mechanism responsive to an impulse.

6. In a supervisory control system, a first station, a second station, a single signalling circuit connecting said stations, a plurality of apparatus units including a metering transmitter at the second station, a plurality of selection keys at the first station individual to the apparatus units at the first station, a metering receiver associated with the selection key individual to the metering transmitter, transmitting and receiving means at each station, means including one of said selection keys and said transmitter at the first station and said receiver at the second station for selecting one of the apparatus units at the second station, means at the first station operable in response to the operation of the transmitter to select the metering transmitter for selecting the metering receiver, means at each station including the transmitter thereat and the receiver at the other station operable in response to the selection for alternately transmitting holding and supervisory signals over the signalling line to hold the selection and to indicate the selection at the first station, and means including the transmitter at the first station and receiver at the second station whereby the metering transmitter and receiver may be directly connected to the signalling circuit.

7. In a supervisory control system, a first station, a second station, a single signalling line connecting said stations, a synchronism indicator at the first station, a plurality of apparatus units at the second station including a circuit breaker and a synchronism transmitter associated therewith, means whereby the circuit breaker and its associated synchronizing transmitter may be selected for operation from the first station over said signalling line, means operable following said selection whereby the synchronism indicator and the synchronizing transmitter may be connected directly to the signalling circuit, and means whereby the synchronism transmitter and receiver may be disconnected from the signalling line and the selected breaker closed thereover.

8. In a signalling system, in combination, a first station, a second station, a single signalling channel connecting said stations, a receiver at each station normally connected to the signalling channel and including a plurality of relay means selectively responsive to single impulse signals of steady and pulsating currents of both polarities and alternating current, a transmitter at each station normally disconnected from the signalling channel and including a source of direct current and a plurality of relays selectively operable to produce single impulse signals of steady and pulsating currents of both polarities and alternating current and means at each station whereby the transmitter thereat may be conditioned to produce one of said signals, initiated into operation and connected to the signalling channel and the receiver thereat disconnected from the signalling channel.

9. In a signalling system, in combination, a first station, a second station, a single signalling channel connecting said stations, a receiver at each station normally connected to the signalling channel and including a plurality of relay means selectively responsive to single impulse signals of steady and pulsating currents of both polarities and alternating current, a transmitter at each station normally disconnected from the signalling channel and including a source of direct current and a plurality of relays selectively operable to produce single impulse signals of steady and pulsating currents of both polarities and alternating current, relay means at each station operable to disconnect the receiver from the signalling channel and to connect the transmitter to said channel, and means at each station selectively operable to condition the transmitter thereat to produce any one of said single impulse signals and to operate said relay means to connect the transmitter to the signalling channel.

10. In a supervisory control system, a first station, a second station, a single signalling line connecting said stations, a plurality of apparatus units at the second station including raise-lower control means and a metering transmitter, a metering receiver at the first station, means including the signalling line whereby any one of said apparatus units at the second station may be selected from said first station, means at the second station responsive to the selection of the raise and lower control means thereat for conditioning the metering transmitter for operation, means at the first station operable following the selection of the raise-lower control at the second station for conditioning the metering receiver for operation, and means whereby the raise-lower control means may be selectively initiated into operation from the first station over the signalling line, means at both stations operable following the initiation of the operation of the raise-lower control means for connecting the metering receiver and transmitter to the signalling circuit, thereby to provide a continuous indication of the results produced by the operation of the raise-lower control means.

H. P. BOSWAU.